United States Patent
Gerth

(10) Patent No.: US 12,201,488 B2
(45) Date of Patent: Jan. 21, 2025

(54) COMPENSATING DEVIATIONS USING A PARTIAL MANUFACTURING RESULT

(71) Applicant: EXOCAD GMBH, Darmstadt (DE)

(72) Inventor: Maik Gerth, Darmstadt (DE)

(73) Assignee: EXOCAD GMBH, Darmstadt (DE)

( * ) Notice: Subject to any disclaimer, the term of this patent is extended or adjusted under 35 U.S.C. 154(b) by 616 days.

(21) Appl. No.: 17/463,649

(22) Filed: Sep. 1, 2021

(65) Prior Publication Data

US 2023/0064331 A1    Mar. 2, 2023

(51) Int. Cl.
| | |
|---|---|
| A61C 13/00 | (2006.01) |
| A61C 9/00 | (2006.01) |
| A61C 13/10 | (2006.01) |
| A61C 13/34 | (2006.01) |

(52) U.S. Cl.
CPC ........ *A61C 13/0004* (2013.01); *A61C 9/0053* (2013.01); *A61C 13/10* (2013.01); *A61C 13/34* (2013.01)

(58) Field of Classification Search
CPC ... A61C 13/0004; A61C 9/0053; A61C 13/10; A61C 13/34
See application file for complete search history.

(56) References Cited

U.S. PATENT DOCUMENTS

| | | | |
|---|---|---|---|
| 10,758,321 B2 * | 9/2020 | Stone-Collonge | ....... A61C 7/08 |
| 2006/0093982 A1 | 5/2006 | Wen | |
| 2010/0086899 A1 | 4/2010 | Holzner et al. | |
| 2019/0294743 A1 | 9/2019 | Ajri et al. | |
| 2019/0318479 A1 | 10/2019 | Ajri et al. | |
| 2020/0000551 A1 * | 1/2020 | Li | ......... A61C 9/0053 |
| 2020/0078143 A1 | 3/2020 | Schulter et al. | |
| 2020/0174451 A1 * | 6/2020 | Chanin | .................. B33Y 50/00 |
| 2021/0097212 A1 | 4/2021 | Schonenberger | |

FOREIGN PATENT DOCUMENTS

EP    2324793 A1    5/2011

* cited by examiner

Primary Examiner — Rick K Chang
(74) Attorney, Agent, or Firm — PERRY + CURRIER INC.

(57) ABSTRACT

The invention relates to method for manufacturing a dental prosthetic assembly. The dental prosthetic assembly comprises a first and a second element. The first element comprises a first connection portion with a reception configured to establish a mechanical connection between the first and the second element by receiving a protrusion of a second connection portion comprised by the second element.

36 Claims, 12 Drawing Sheets

COMPENSATING DEVIATIONS USING A PARTIAL MANUFACTURING RESULT

The invention relates to the field of dental technology. More particularly, the invention relates to a method for manufacturing a dental prosthetic assembly. The invention furthermore relates to a computer program product and a manufacturing system for manufacturing a dental prosthetic assembly.

In dental technology, there are several types of dental prosthetic assemblies comprising elements, which have to fit over each other precisely. Such an assembly may, e.g., comprise a superstructure, like a crown, which has to fit on a base, like an abutment, in a precise, predefined manner. When manufacturing such an assembly, in particular when using rapid prototyping techniques, deviations may occur, due to manufacturing inaccuracies. Such deviations may, e.g., result in a blocking of the superstructure, when being push onto the base, a misaligned fit of the superstructure on the base, or a loose fit providing insufficient support for the superstructure by the base. Such manufacturing inaccuracies may, e.g., occur, when manufacturing the base as well as when manufacturing the superstructure.

It is an objective to provide for a method, a manufacturing system and computer program product for manufacturing a dental prosthetic assembly.

In one aspect, the invention relates to a method for manufacturing a dental prosthetic assembly. The dental prosthetic assembly comprises a first and a second element. The first element comprises a first connection portion with a reception configured to establish a mechanical connection between the first and the second element by receiving a protrusion of a second connection portion comprised by the second element.

The method comprises providing a first 3D digital model of the first element as a first template and a second 3D digital model of the second element as a second template. A first physical copy of the first element is manufactured using the first template or of the second element using the second template. Scan data of the manufactured first physical copy is acquired. A 3D digital scan model of at least a part of the manufactured first physical copy is provided using the scan data. Using the scan model deviations of the mechanical connection violating one or more fitting criteria are determined, when replacing for establishing the mechanical connection the template used for the manufacturing of the first physical copy by the scan model. The determined deviations of the mechanical connection are compensated to satisfy the one or more violated fitting criteria. The compensating comprises modifying the template not used for manufacturing the first physical copy. A second physical copy is manufactured using the modified template.

Examples may have the beneficial effect of using an analysis of the manufactured first physical copy for modifying the second template used for manufacturing the second physical copy in order to compensate deviations violating a fitting criterium. Thus, inaccuracies occurring, when manufacturing the first physical copy, may be taken into account and compensated, when manufacturing the second physical model. For this purpose, the second template used for manufacturing the second physical copy is modifying.

Depending on the deviations, e.g., on the size, form and/or location of the deviation, the modification of the template used for manufacturing the second physical copy may be sufficient for compensating the deviations such that no deviations violating a fitting criterium remain.

The providing of the first and second 3D digital models may comprise generating the first 3D digital model of the first element as the first template and the second 3D digital model of the second element as the second template.

Computer-aided design (CAD) may be used for generating, modifying, analyzing, and/or optimizing the digital 3D models of dental prosthetic assemblies. The digital 3D models may define geometrical forms of objects, e.g., surfaces of those 3D objects. Furthermore, for manufacturing physical copies of the digital 3D models defined using CAD computer-aided manufacturing (CAM) may be used to control manufacturing devices, e.g., machining devices and/or 3D printing devices, to manufacture physical copies defined by the digital 3D models, which are used as templates.

For example, artificial intelligence (AI) capabilities may be used to compensate the determined deviations of the mechanical connection. The AI capabilities may, e.g., comprise a trained machine learning model. Such a trained machine learning model may be provided for compensating deviations of the mechanical connection. The compensating may comprise modifying the template not used for manufacturing the first physical copy. The compensating may further comprise additionally modifying the template used for manufacturing the first physical copy.

The trained machine learning model may be configured for making a prediction of a modified template, i.e., a modification of the template not used for manufacturing the first physical copy, such that the one or more violated fitting criteria are satisfied. The trained machine learning model may further be configured for making a prediction of an additional modified template, i.e., a modification of the template used for manufacturing the first physical copy, such that the one or more violated fitting criteria are satisfied.

The 3D digital scan model and the template not used for manufacturing the first physical copy may be provided as input to the trained machine learning model. In response to the providing of the input, a prediction of the modified template not used for manufacturing the first physical copy may be received from the trained machine learning model as an output.

This output, i.e., the modified template, may be used for manufacturing the second physical copy.

In addition, the template used for manufacturing the first physical copy may be provided as an additional input to the trained machine learning model. In response to the providing of the additional input, furthermore a prediction of the additional modified template used for manufacturing the first physical copy may be received from the trained machine learning model as an additional output. This additional output, i.e., the additional modified template, may be used for re-manufacturing or subsequently machining the second physical copy.

In order to provide the trained machine learning model for compensating deviations of the mechanical connection, an untrained machine learning model may be trained. The training of the untrained machine learning model for providing the trained model may comprise providing the respective untrained machine learning model. A set of training data may be provided comprising a plurality of training datasets. Each training dataset may comprise a training input and a training output. Each training input may comprise a 3D digital scan model and a template not used for manufacturing a first physical copy. Each training output may comprise a modification of the respective template not used for manufacturing a first physical copy. The untrained machine-learning model is trained using the training data to provide the training output as a prediction of a compensation in response to receiving the training input of the respective training dataset, thereby creating the trained model. The trained machine learning model may then be provided for making predictions of modified templates for manufacturing second physical copies as described herein.

Each training input may further comprise an additional template used for manufacturing the first physical copy. Each training output may further comprise a modification of the respective additional template used for manufacturing a first physical copy. The untrained machine-learning model is trained using the training data to provide the training output comprising the additional modified template as an additional prediction of a compensation in response to receiving the training input of the respective training dataset comprising the additional template, thereby creating the trained model. The trained machine learning model may then be provided for making additional predictions of additional modified templates for re-manufacturing or subsequently machining first physical copies as described herein.

The term "machine learning" (ML) refers to a computer algorithm used to extract useful information from training data sets by building probabilistic models, which are referred to as machine learning models or predictive models, in an automated way. Machine learning algorithms build a mathematical model based on sample data, known as "training data", in order to make predictions or decisions without being explicitly programmed to perform the task. The machine learning may be performed using a learning algorithm such as supervised or unsupervised learning. The machine learning may be based on various techniques such as clustering, classification, linear regression, reinforcement, self-learning, support vector machines, neural networks, etc. A machine learning model may, e.g., be a data structure or program such as a neural network, in particular a convolutional neural network, a support vector machine, a decision tree, a Bayesian network etc. The machine learning model may be adapted to predict an unmeasured value, e.g., a modification of a template for an element of a dental prosthetic assembly to be manufactured from other, known values, e.g., a scan model and a template. According to an example, the machine learning model is a deep learning model.

For example, artificial intelligence (AI) capabilities may further be used for the determining deviations of the mechanical connection violating the one or more fitting criteria. The AI capabilities may, e.g., comprise a trained machine learning model. Such a trained machine learning model may be provided for determining the deviations of the mechanical connection violating the one or more fitting criteria.

The trained machine learning model may be configured for making a prediction of deviations violating one or more fitting criteria. The 3D digital scan model and the template not used for manufacturing the first physical copy may be provided as input to the trained machine learning model. In response to the providing of the input, a prediction of the deviations violating one or more of the fitting criteria may be received from the trained machine learning model as an output. This output, i.e., the determination of the deviations violating one or more of the fitting criteria, may be used for modifying templates in order to compensate the determined deviations.

In order to provide the trained machine learning model for determining deviations violating fitting criteria, an untrained machine learning model may be trained. The training of the untrained machine learning model for providing the trained model may comprise providing the respective untrained machine learning model. A set of training data may be provided comprising a plurality of training datasets. Each training dataset may comprise a training input and a training output. Each training input may comprise a 3D digital scan model and a template not used for manufacturing a first physical copy. Each training output may comprise a determination of deviations of the mechanical connection violating fitting criteria. The untrained machine-learning model is trained using the training data to provide the training output as a prediction of deviations violating fitting criteria in response to receiving the training input of the respective training dataset, thereby creating the trained model. The trained machine learning model may then be provided for making predictions of deviations of mechanical connections violating fitting criteria as described herein.

The machine learning model may thus be adapted to determine a value, e.g., a deviation violating a fitting criterium from other, known values, e.g., a scan model and a template. According to an example, the machine learning model is a deep learning model.

For example, a determination of one or more deviations violating one or more fitting criteria may be executed by the machine learning model, when predicting, modifications of one or more templates as output in response to receiving a 3D digital scan model and one or more template as input.

For example, the method further comprises simulating a manufacturing of a second physical copy of the second element using the template not used for manufacturing the first physical copy resulting in simulation results. For the determining the deviations of the mechanical connection violating the one or more fitting criteria, the template not used for manufacturing the first physical copy is replaced by the simulation results for establishing the mechanical connection.

Examples may have the beneficial effect that a simulation of the manufacturing of the second physical copy may in addition take into account possible effects of the manufacturing of the second physical copy, when determining deviations violating fitting criteria. For example, the first is manufactured using machining. The simulating of the manufacturing may comprise simulating of machining paths of a machining tool within a blank being machined. Examples may have the beneficial effect that the machining of the blank and thus a physical copy resulting from the machining may be simulated. Based on such a simulation, deviations, e.g., due to manufacturing inaccuracies, may be determine taken into account predictions for the manufacturing of the second copy. The determined deviations may be used for modifying, if necessary, the template for manufacturing the second physical copy such that a precise mechanical connection between the manufactured elements can be ensured. Furthermore, the determined deviations may be used for modifying, if necessary, the template used for manufacturing the first physical copy such that a precise mechanical connection between the manufactured elements can be ensured. The modified template may, e.g., be used for a re-manufacturing or a subsequent machining of the first physical copy.

For example, the simulating of the manufacturing is a machining device specific simulation. For example, different simulation parameter for different machining devices may be provided. Thus, a machining device specific simulation may be executed taking into account individual features of the machining device intended to be used for manufacturing an element for which a manufacturing is simulated.

Examples may have the beneficial effect that precise and realistic simulation results may be provided for different machining devices.

For example, simulations may be executed for different machining devices available and, e.g., the machining device for which the fewest and/or smallest deviations are determined may be selected for manufacturing an element of the dental prosthetic assembly.

For example, the simulating of the manufacturing may be a machining material and/or blank specific simulation. For example, different simulation parameter for different machining materials and/or blanks may be provided. Thus, a machining material specific simulation may be executed taking into account individual features of the machining material and/or the blank intended to be used for manufacturing an element for which a manufacturing is simulated. Examples may have the beneficial effect that precise and realistic simulation results may be provided for different machining materials and/or blanks.

For example, the simulating of the manufacturing may be a machining tool specific simulation. Different machining tools may, e.g., comprise different machining of different sizes. For example, different simulation parameter for different machining tools may be provided. Thus, a machining tool specific simulation may be executed taking into account individual features of the machining tolls intended to be used for manufacturing an element for which a manufacturing is simulated. Examples may have the beneficial effect that precise and realistic simulation results may be provided for different machining tools.

For example, the second physical copy is manufactured using 3D printing. The simulating of the manufacturing may comprise simulating printing paths of printing material applied by a printing device. Examples may have the beneficial effect that the printing and thus a physical copy resulting from the printing may be simulated. Based on such a simulation, deviations, e.g., due to manufacturing inaccuracies, may be determine taken into account predictions for the manufacturing of the second copy. The determined deviations may be used for modifying, if necessary, the template for manufacturing the second physical copy such that a precise mechanical connection between the manufactured elements can be ensured.

Furthermore, the determined deviations may be used for modifying, if necessary, the template used for manufacturing the first physical copy such that a precise mechanical connection between the manufactured elements can be ensured. The modified template may, e.g., be used for a re-manufacturing or a subsequent machining of the first physical copy.

For example, the simulating of the manufacturing is a printing device specific simulation. For example, different simulation parameter for different printing devices may be provided. Thus, a printing device specific simulation may be executed taking into account individual features of the printing device intended to be used for manufacturing an element for which a manufacturing is simulated. Examples may have the beneficial effect that precise and realistic simulation results may be provided for different printing devices.

For example, simulations may be executed for different printing devices available and, e.g., the printing device for which the fewest and/or smallest deviations are determined may be selected for manufacturing an element of the dental prosthetic assembly.

For example, the simulating of the manufacturing may be a printing material specific simulation. For example, different simulation parameter for different printing materials may be provided. Thus, a printing material specific simulation may be executed taking into account individual features of the printing material intended to be used for manufacturing an element for which a manufacturing is simulated. Examples may have the beneficial effect that precise and realistic simulation results may be provided for different printing materials.

For example, the simulating of the manufacturing may be a printing tool specific simulation. Different printing tools may, e.g., comprise different printing nozzles, e.g., with different diameters. For example, different simulation parameter for different printing tools may be provided. Thus, a printing tool specific simulation may be executed taking into account individual features of the printing tolls intended to be used for manufacturing an element for which a manufacturing is simulated. Examples may have the beneficial effect that precise and realistic simulation results may be provided for different printing tools.

For example, artificial intelligence (AI) capabilities may further be used for the simulating of the manufacturing of the second physical copy. The AI capabilities may, e.g., comprise a trained machine learning model. Such a trained machine learning model may be provided for simulating the manufacturing of the second physical copy.

The trained machine learning model may be configured for making a prediction of a simulation of a second physical copy, i.e., for providing simulation results of a manufacturing of the second physical copy. The template not used for manufacturing the first physical copy may be provided as input to the trained machine learning model. In response to the providing of the input, a prediction of the simulation results of a simulation of the second physical copy may be received from the trained machine learning model as an output. This output, i.e., the simulation results of the second physical copy may be used for determining deviations of the mechanical connection violating one or more of the fitting criteria.

In order to provide the trained machine learning model for providing simulation results of a manufacturing of the second physical copy, an untrained machine learning model may be trained. The training of the untrained machine learning model for providing the trained model may comprise providing the respective untrained machine learning model. A set of training data may be provided comprising a plurality of training datasets. Each training dataset may comprise a training input and a training output. Each training input may comprise a template not used for manufacturing a first physical copy. Each training output may comprise a result of a manufacturing of a second physical copy using the template provided as input. The untrained machine-learning model is trained using the training data to provide the training output as a prediction of manufacturing results, i.e., as a simulation of the manufacturing of the second physical copy. The trained machine learning model may then be provided for making predictions of simulation results as described herein.

The machine learning model may thus be adapted to determine values, e.g., simulation results from other, known values, e.g., a template. According to an example, the machine learning model is a deep learning model.

For example, the compensating of the determined deviations further comprises additionally modifying the template used for manufacturing the first physical copy to compensate the determined deviations. The first physical copy is re-manufactured using the additionally modified template.

Examples may have the beneficial effect that in addition to the compensation by modifying the template for manufacturing the second physical copy, a compensation may be implemented by re-manufacturing the first physical copy using a modified first template. A re-manufacturing of the first physical copy may, e.g., be executed, in case that it may not be possible to compensate the deviations determined solely by modifying the second template. For example, a compensation by solely modifying the second template may result in weakening of the second physical copy. Such a weakening may, e.g., occur in case the modification results in a material thickness, e.g., wall thickness, falling below a predefined threshold.

Furthermore, such a modification may result in an insufficient support provided by the second physical copy for the first physical copy, when establishing the mechanical connection. Such problems may be resolved by re-manufacturing the first physical copy using a modified first template. A re-manufacturing of the first physical copy may in particular be used for compensating deviations, in case modifications defined by the modified first template cannot be implemented by modifying the manufactured first physical copy. For example, the modifications defined by the modified first template may require adding material to the first physical copy. In case an adding of material may not be possible, e.g., in case a machining is used to manufacture the first physical copy, a re-manufacturing of the first physical copy may be required. For example, a new blank may be provided and the first physical copy re-manufactured using the modified first template.

For example, a compensation of the deviations may require a modification of a relative position and/or orientation between the first and the second element, when establishing the mechanical connection. A modification of the relative position and/or orientation between the first and the second element may require a modification of both physical copies, i.e., the second physical copy to be manufactured and the first physical copy already manufactured. For example, a modification of the first physical copy may require a re-manufacturing of the first physical copy.

For example, the compensating of the determined deviations further comprises additionally modifying the template used for manufacturing the first physical copy by removing one or more parts of the respective template to compensate the determined deviations. Machining parameters are determined for a subsequent machining of the manufactured first physical copy using the additionally modified template. The compensating further comprises a subsequent machining of the manufactured first physical copy using the determined machining parameters to compensate the determined deviations.

Examples may have the beneficial effect that an additional modification of the first physical copy may be implemented by a subsequent machining of the manufactured first physical copy. Thus, a re-manufacturing of the manufactured first physical copy may be avoided. Avoiding a re-manufacturing of the manufactured first physical copy may have the beneficial effect that a subsequent machining may, e.g., be faster than a re-manufacturing and material may be saved.

By additionally modifying the template used for manufacturing the first physical copy, an additionally modified template may be provided. This additionally modified template may be used to determine the machining parameters for the subsequent machining.

For example, for the subsequent machining of the first physical copy the same machining tool is used as for the manufacturing of the first physical copy.

For example, for the subsequent machining of the first physical copy a different machining tool is used with a reduced size compared to the machining tool used for the manufacturing of the first physical copy.

Examples may have the beneficial effect that using a machining tool with a reduced size, i.e., a finer tool, may enable a higher precision of the machining. Using a machining tool with a larger size, i.e., a coarser tool, may enable a faster manufacturing of the first physical copy. Using a finer tool only for modifying the manufactured first physical copy, i.e., for a subsequent machining, may allow for a faster manufacturing due to the coarser tool used before as well as a fine shaping of the surface of the first physical copy by the subsequent machining.

For example, the manufacturing of the second physical copy is started using the template not used for manufacturing the first physical copy. The manufacturing of the second physical copy is started simultaneously with or during one of the following process steps: the manufacturing of the first physical copy, the acquiring of the scan data of the manufactured first physical copy, the providing of the scan model, the determining of the deviations of the mechanical connection, the compensating of the determined deviations. The manufacturing of the second physical copy using the template not used for manufacturing the first physical copy is interrupted at an intermediate state. Upon finishing the modifying of the template not used for manufacturing the first physical copy, the interrupted manufacturing of the second physical copy is continued using the modified template to finalize the manufacturing.

Thus, the manufacturing of the second physical copy may be executed at least temporarily simultaneously to one or more of the following stages of manufacturing, analyzing and/or implementing analysis results relating of the first physical copy:

the manufacturing of the first physical copy, the acquiring of the scan data of the manufactured first physical copy, the providing of the scan model, the determining of the deviations of the mechanical connection, the compensating of the determined deviations.

For manufacturing the intermediate state of the second physical copy, the unmodified second template is used, while for finalizing the second physical copy the modified second template is used.

Examples may have the beneficial effect of enabling of a faster manufacturing of the assembly, since the two physical copies may at least temporarily be manufactured simultaneously. Alternatively or additionally, the second physical copy may at least temporarily be manufactured simultaneously with the analysis and/or implementation of the analysis results of the first physical copy. An at least temporarily simultaneous manufacturing may be faster than a subsequent manufacturing. The second physical copy may be manufactured until the intermediate state is reached. The intermediate state may be a state defined based on the on the second template for manufacturing the second physical copy. Intermediate state may be a state defined by a predefined difference between the intermediate state and the state defined by the second template. The difference may be defined as a number of layers or a thickness of material required to be added to the intermediate state in order to reach the state defined by the second template. Alternatively, the difference may be defined as a number of layers or a thickness of material required to be removed from the intermediate state in order to reach the state defined by the second template.

By interrupting the manufacturing of the second physical copy at the intermediate stage, the advantage of a faster manufacturing may be combined with the advantage of taking into account inaccuracies resulting from the manufacturing of the first physical copy, while finalize the manufacturing of the second physical copy.

For example, the manufacturing of the second physical copy is started after the modifying of the template not used for manufacturing the first physical copy is finished. In this case, e.g., only the modified second template may be used for manufacturing the second physical copy.

For example, the mechanical connection, when being established, defines a relative position of the second element with respect to the first element. The fitting criteria comprise a first maximum value for deviations of the second element from the defined relative position.

Examples may have the beneficial effect that by modifying the second and/or first template the relative position between the two elements of the dental prosthetic assembly may be adjusted such that any deviations of the relative position are, e.g., within a predefined range. The relative position between the two elements may, e.g., define a position, in particular a visible position, of at least one of the elements in a patient's mouth, when implementing the dental prosthetic assembly therein. For example, in case of an abutment and a crown, the relative position between the abutment and the crown, may define the position of the crown within a patient's mouth with the abutment or an implant, on which the abutment is mounted, as a point of reference.

For example, the mechanical connection, when being established, defines a relative orientation of the second element with respect to the first element. The fitting criteria comprise a second maximum value for deviations of the second element from the defined relative orientation.

Examples may have the beneficial effect that by modifying the second and/or first template the relative orientation between the two elements of the dental prosthetic assembly may be adjusted such that any deviations of the relative orientation are, e.g., within a predefined range. The relative orientation between the two elements may, e.g., define an orientation, in particular a visible orientation, of at least one of the elements in a patient's mouth, when implementing the dental prosthetic assembly therein. For example, in case of an abutment and a crown, the relative orientation between the abutment and the crown, may define the orientation of the crown within a patient's mouth with the abutment or an implant, on which the abutment is mounted, providing a point and/or direction of reference.

For example, the determining of the deviations of the mechanical connection is restricted to selected sections of the mechanical connection comprising one or more of the following: a set of one or more selected first sections of the first connection portion, a set of one or more selected second sections of the second connection portion.

Examples may have the beneficial effect of only taking selected sections of the mechanical connection into account for an analysis of deviations and thus modifications. Thus, depending on the sections being selected, the analysis may, e.g., be executed faster and focused on sections influencing the mechanical connection, e.g., a relative position and/or orientation of the connected element, potentially the most. For example, when inserting a protrusion into a reception, a top section of the protrusion may be of less relevance than lateral surfaces facing the protrusion inner surfaces of the reception and/or a rim extending around a bottom of the protrusion and defining an insertion depth of the protrusion into the reception.

For example, the selected one or more first sections cover the entire first connection portion. Examples may have the beneficial effect that the entire first connection portion may be taken into account, when determining deviations violating fitting criteria.

For example, the selected one or more first sections cover one or more sub-portions of the first connection portion with one or more sub-portions of the first connection portion remaining uncovered. Examples may have the beneficial effect that only a part of the first connection portion may be taken into account, when determining deviations violating fitting criteria.

For example, the selected one or more second sections cover the entire second connection portion. Examples may have the beneficial effect that the entire second connection portion may be taken into account, when determining deviations violating fitting criteria.

For example, the selected one or more second sections cover one or more sub-portions of the second connection portion with one or more sub-portions of the second connection portion remaining uncovered. Examples may have the beneficial effect that only a part of the first connection portion may be taken into account, when determining deviations violating fitting criteria.

For example, the selected first and second sections are selected pairwise. The first and second section of each pair comprise a first and second surface facing each other. Examples may have the beneficial effect that the relative influence, e.g., a relative position and/or relative orientation, of surfaces of the two elements facing each other may be take into account, when determining deviations violating fitting criteria. For example, only sections of surface facing each other may be taken into account.

For example, image pattern recognition is used for selecting the first and second sections. The image pattern recognition is one of the following: a 2D image pattern recognition, a 3D image pattern recognition. Examples may have the beneficial effect that using image pattern recognition, specific surfaces and/or sections of the manufactured first physical copy resembled by the scan data may be identified. Thus, surfaces of the manufactured first physical copy defined by the scan data facing surfaces of the second physical model to be manufactured may be determined.

For example, the mechanical connection, when being established, defines a clearance between the first and second connection portion. The fitting criteria comprise a minimum value of the clearance. Examples may have the beneficial effect that a sufficiently large clearance, at least between selected sections of the connection portions, may be ensured. A sufficient clearance may ensure that the first element fits over the first element. A sufficient clearance may further ensure, that sufficient space may be provided for an adhesive, like a dental cement, to be inserted into the clearance. Such an adhesive may be used to implement a bonding between the elements.

The mechanical connection may, e.g., be a connection such that the second element is non-destructively detachable from the first element of the dental prosthetic assembly. Even in case of using an adhesive to establish the mechanical connection, the second element may be detachable from the first element of the dental prosthetic assembly using suitable measures.

For example, deviations of the mechanical connection with respect to the clearance are determined between the selected first and second sections of the templates. Examples may have the beneficial effect the clearance only between selected sections may be taken into account. In sections, which are less important or less error-prone, the minimum size of the clearance may not be taken into account as a fitting criterium.

For example, the fitting criteria further comprise a maximum value of the clearance. Examples may have the beneficial effect that it may be ensured that the clearance does not become too large. A too large clearance may, e.g., may result in a loose fit of the first element on the second element, i.e., an insufficient support of the first element by the second element.

For example, the method further comprises determining using the acquired scan data deviations of the manufactured first physical copy from the template used for the manufacturing of the first physical copy violating the fitting criteria. The fitting criteria further comprise a maximum value of the deviations of the manufactured first physical copy.

Examples may have the beneficial effect that it may be ensured that the manufactured first physical copy only comprises deviations from the template used to manufacture the first physical copy within a predefined range. Thus, the manufactured first physical copy per se may be checked by comparing the scan model with the template used for manufacturing the first physical copy. In case of deviations exceeding a predefined threshold, the manufactured first physical copy may, e.g., be modified in order to compensate the deviations. For example, modifying the first physical copy may comprise a subsequent machining or re-manufacturing of the manufactured first physical copy.

For example, the deviations of the manufactured first physical copy are determined within the selected sections of the respective template violating one or more fitting criteria. Examples may have the beneficial effect of only taking selected sections of the manufactured first physical copy into account for an analysis of deviations and thus modifications. Thus, depending on the sections being selected, the analysis may, e.g., be executed faster and focused on sections influencing the mechanical connection, e.g., a relative position and/or orientation of the connected element, potentially the most. Sections of the manufactured first physical copy not relevant for the mechanical connection with the second physical copy may, e.g., be neglected. For example, surfaces of the first physical copy facing away from the second physical copy, when establishing the mechanical connection, may be neglected. For example, inner structures within the first physical copy, like, e.g., a screwing channel configured for receiving a screw used to mount the dental prosthetic assembly on a manufactured first physical copy implant may be neglected.

For example, for the determining of the deviations scan data of the selected ones of the sections of the manufactured first physical copy is selected from the acquired scan data. Examples may have the beneficial effect that only scan data resembling relevant sections may, e.g., be taken into account. The relevant scan data may, e.g., be selected using the scan model. The scan model may be provided and from the scan model, relevant section, i.e., relevant scan data may be selected.

For example, image pattern recognition is used for the selecting of the scan data. The image pattern recognition is one of the following: a 2D image pattern recognition, a 3D image pattern recognition. Examples may have the beneficial effect that using image pattern recognition, specific surfaces and/or sections of the scan data, e.g., of the scan model, may be identified. Thus, relevant surfaces of the manufactured first physical copy defined by the scan data may be determined.

For example, one or more of the fitting criteria are position depending. Examples may have the beneficial effect the type and/or size of the fitting criteria may be position depending. At specific positions of the first and/or second element, e.g., lager deviations may be allowed, while at other positions even small deviations may have a lager impact on the mechanical connection between the first and second physical copy. Therefore, at some positions stricter thresholds may be apply to deviations than at other positions. At different positions, different types of fitting criteria may apply. At some portions, e.g., minimum and maximum thresholds may apply, while at other positions, e.g., only a minimum or a maximum threshold may apply.

For example, the first and second connection portions comprise one or more of the following of the first and second connection portion: a ridge, a notch, a rim, an edge, a hole. The protrusion and/or reception may comprise or be limited by a structure comprising a ridge, notch, rim, edge and/or hole. Such a structure may, e.g., be used to control a relative position and/or relative orientation between the first and second physical copy.

For example, the determining of the deviations comprises a registration of the scan model with the template used for the manufacturing of the first physical copy. Examples may have the beneficial effect that by registering the scan model with the template used for the manufacturing of the first physical copy, the respective template may entirely or at least partially be replaceable by the scan model, in order to determine the effects of manufacturing inaccuracies defined by the scan models on the mechanic connection.

For example, image pattern recognition is used for the registration of the scan model with the template used for the manufacturing of the first physical copy. The image pattern recognition is one of the following: a 2D image pattern recognition, a 3D image pattern recognition. Examples may have the beneficial effect that using image pattern recognition, corresponding surfaces and/or sections of the scan model and the template used for the manufacturing of the first physical copy may be identified.

For example, the registration of the scan model with the template may be an ICP-registration, i.e., a registration using the iterative closest point algorithm to minimize the difference between two clouds of points.

For example, the scan model is registered with the template used for the manufacturing of the first physical copy directly. Examples may have the beneficial effect that corresponding surfaces and/or sections of the scan model and the template used for the manufacturing of the first physical copy may be identified, based on which a direct registration may be implemented.

For example, the scan model is registered with the template used for the manufacturing of the first physical copy indirectly. The indirect registration comprises defining a position of the template used for the manufacturing of the first physical copy within a fourth 3D digital model of at least a part of a dentition of a patient. The scan model is arranged in the fourth 3D digital model at the predefined position within the fourth 3D digital model.

Examples may have the beneficial effect that an additional model may be used as a reference for positioning the scan model. By positioning the scan model at a position defined for the template used for the manufacturing of the first physical copy, an indirect registration may be implemented.

For example, the template used for the manufacturing of the first physical copy comprises one or more markers. The first physical copy comprises copies of the one or more markers. The one or more markers are used for the registration of the scan model with the template used for the manufacturing of the first physical copy.

Examples may have the beneficial effect that using marker, a registration may be simplified. Using marker, e.g., no image pattern recognition or an image pattern recognition restricted to the marker may be required.

For example, artificial intelligence (AI) capabilities may further be used for registration, in particular image-pattern-recognition-based registration. The AI capabilities may, e.g., comprise a trained machine learning model. Such a trained machine learning model may be provided for registering digital images or models. The digital images or models may, e.g., be 2D or 3D digital images or models.

The trained machine learning model may be configured for making a prediction of a registering a first digital image or model with a second digital image or model. The first digital image or model may be provided as input to the trained machine learning model. In response to the providing of the input, a prediction of a registration of the first digital image or model with a second digital image or model may be received from the trained machine learning model as an output. This output, i.e., the registration of the first digital image or model with the second digital image or model, may be used for manufacturing a dental prosthetic assembly as described herein.

In order to provide the trained machine learning model for registering a first digital image or model with a second digital image or model, an untrained machine learning model may be trained. The training of the untrained machine learning model for providing the trained model may comprise providing the respective untrained machine learning model. A set of training data may be provided comprising a plurality of training datasets. Each training dataset may comprise a training input and a training output. Each training input may comprise a first and a second digital image or model. Each training output may comprise a definition of a registration of the first digital image or model with the second digital image or model. The untrained machine-learning model is trained using the training data to provide the training output as a prediction of a registration of the first digital image or model with the second digital image or model in response to receiving the training input of the respective training dataset, thereby creating the trained model. The trained machine learning model may then be provided for making predictions of a registrations as described herein.

The machine learning model may thus be adapted to determine values, e.g., a registration of a first digital image or model with a second digital image or model from other, known values, e.g., the first and second digital image or model. According to an example, the machine learning model is a deep learning model.

For example, the first and second physical copy are manufactured using at least one of the following: machining, 3D printing. For machining, a blank may be provided from which material is removed using one or more machining tools. For 3D printing, a 3D printing device may be used to print the respective physical copy layer by layer.

For example, both physical copies may be manufactured using the same method or the two physical copies may be manufactured different methods.

For example, the second element is an abutment and the first element is one of the following: a crown, an abutment tooth of a bridge, an abutment tooth of a partial removable denture.

Thus, the dental prosthetic assembly may comprise a crown, a bridge or a partial removable denture configured to be fixated in using an abutment.

For example, the second element is a bar and the first element is one of the following: a bar denture, a part of a bar denture.

Thus, the dental prosthetic assembly may comprise a bar denture or part of a bar denture configured to be fixated in using a bar.

In another aspect, the invention relates to a computer program product for manufacturing a dental prosthetic assembly. The dental prosthetic assembly comprises a first and a second element. The first element comprises a first connection portion with a reception configured to establish a mechanical connection between the first and the second element by receiving a protrusion of a second connection portion comprised by the second element. The computer program product comprises a computer readable storage medium having program instructions embodied therewith.

The program instructions are executable by a processor of a computer device of a manufacturing system to cause the computer device to control the manufacturing system to provide a first 3D digital model of the first element as a first template and a second 3D digital model of the second element as a second template. A first physical copy of the first element is manufactured using the first template or of the second element using the second template. Scan data of the manufactured first physical copy is acquired. A 3D digital scan model of at least a part of the manufactured first physical copy is provided using the scan data. Using the scan model deviations of the mechanical connection violating one or more fitting criteria are determined, when replacing for establishing the mechanical connection the template used for the manufacturing of the first physical copy by the scan model. The determined deviations of the mechanical connection are compensated to satisfy the one or more violated fitting criteria. The compensating comprises modifying the template not used for manufacturing the first physical copy. A second physical copy is manufactured using the modified template.

The computer-readable program instructions of the computer program product may be configured for executing any of the aforementioned examples of a method for manufacturing a dental prosthetic assembly.

The providing of the first and second 3D digital models may comprise generating the first 3D digital model of the first element as the first template and the second 3D digital model of the second element as the second template.

In another aspect, the invention relates to a manufacturing system for manufacturing a dental prosthetic assembly. The dental prosthetic assembly comprises a first and a second element. The first element comprises a first connection portion with a reception configured to establish a mechanical connection between the first and the second element by receiving a protrusion of a second connection portion comprised by the second element. The manufacturing system comprising a computer device and one or more manufacturing devices. The computer device comprises a processor and a memory storing program instructions executable by the processor.

Execution of the program instructions by the processor causes the computer device to control the manufacturing system using the manufacturing device to provide a first 3D digital model of the first element as a first template and a second 3D digital model of the second element as a second template. A first physical copy of the first element is manufactured using the first template or of the second element using the second template. Scan data of the manufactured first physical copy is acquired. A 3D digital scan model of at least a part of the manufactured first physical copy is provided using the scan data. Using the scan model deviations of the mechanical connection violating one or more fitting criteria are determined, when replacing for establishing the mechanical connection the template used for the manufacturing of the first physical copy by the scan model. The determined deviations of the mechanical connection are compensated to satisfy the one or more violated fitting criteria. The compensating comprises modifying the template not used for manufacturing the first physical copy. A second physical copy is manufactured using the modified template.

The manufacturing system may be configured for executing any of the aforementioned examples of a method for manufacturing a dental prosthetic assembly.

The providing of the first and second 3D digital models may comprise generating the first 3D digital model of the first element as the first template and the second 3D digital model of the second element as the second template.

For example, the manufacturing devices comprise one or more of the following: a machining device, a 3D printing device. The machining device may be configured for removing material from a blank using one or more machining tools by machining. The 3D printing device may be configured to print physical copies layer by layer.

The above-described examples and embodiments may be combined freely as long as the combinations are not mutually exclusive.

In the following, embodiments of the invention are described in greater detail in which FIG. 1 shows a flowchart illustrating an exemplary method for manufacturing a dental prosthetic assembly;

In the following similar features are denoted by the same reference numerals.

Figure 1:
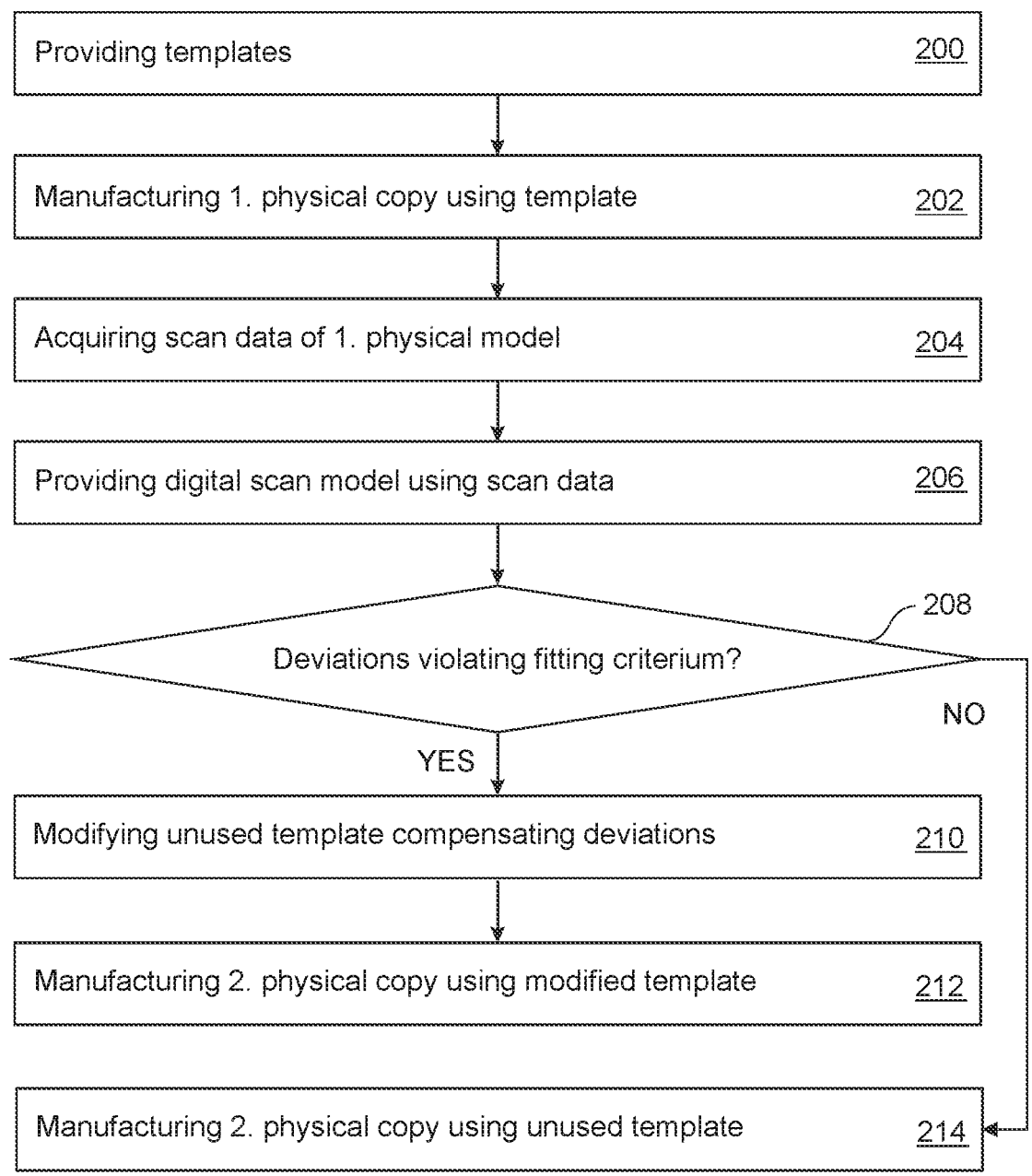

FIG. 1 shows a flowchart illustrating an exemplary method for manufacturing a dental prosthetic assembly. The dental prosthetic assembly to be manufactured comprises at least two elements, i.e., a first and a second element. The first element comprises a first connection portion with a reception, while the second element comprises a second connection portion with a protrusion. First and second connection portions are configured to establish a mechanical connection between the first and the second element. The mechanical connection is established by the reception receiving the protrusion. For example, the first element may be a crown which is put over the second element in form of an abutment. Thus, a mechanical connection may be established between crown and abutment by inserting a protrusion of the abutment into a reception provided by crown.

The exemplary method for manufacturing such a dental prosthetic assembly may comprise in block 200 providing templates for the elements to be manufactured. The providing of the templates may comprise generating the respective templates. A first 3D digital model of the first element may be generated as a first template and a second 3D digital model of the second element may be generated as a second template. The 3D digital models may be generated from scratch or pre-defined models may be provided, which are adjusted to the individual intraoral situation of an individual patient. For example, the abutment may be provided by an abutment library providing different abutments for different artificial teeth provided in form of crowns to be mounted on the abutments. For example, the crown may be selected from a tooth library providing sets of artificial teeth.

For example, a 3D digital model of a patient's intraoral structure may be provided. For example, a 3D digital model of a patient's dentition may be provided. The 3D digital model of the patient's intraoral structure may be generated using scan data. The scan data may be the result of a direct and/or indirect scan of the soft and/or hard tissue of the patient's oral cavity. A direct scan may be an intraoral scan of the patient's mouth, i.e., a scan of soft and/or hard tissues within the patient's oral cavity. An indirect scan may be a scan of an impression of the soft and/or hard tissues of the patient's oral cavity or a scan of a physical model, e.g., a plaster cast model, generated using such an impression. The 3D digital models of the first and the second elements of the dental prosthetic assembly may be generated such that they satisfy the patient's requirements. For example, in case of an amendment and a crown, an implant may be planned to be inserted in one of the patient's jaw bones. For planning a position of the implant, additional scan data may be provided providing information about an inner structure of the patient's jaw bones, like, e.g., scan data acquired using an X-ray scanner and/or a tomography scanner, like a cone beam computed tomography (CBCT) scanner. A desired design of the artificial tooth to be inserted into the patient's dentition may be defined and the abutment as well as the crown may be adjusted to resemble the desired design.

In block 202, a first physical copy of one of the elements of the dental prosthetic assembly is manufactured. The first physical copy may be manufactured using a CAM-method, e.g., machining or 3D printing. For example, a first physical copy of the first element using the first template or a first physical copy of the second element using the second template is manufactured. In case of a dental prosthetic assembly comprising an abutment and a crown, e.g., the abutment using a 3D digital model of the abutment as a template or the crown using a 3D digital model of the crown as a template is manufactured.

In block 204, scan data of the manufactured first physical copy is acquired. For example, the geometrical form of the manufactured first copy is scanned using a 3D scanner, e.g., an optical 3D scanner. The acquired scan data is used to provide a 3D digital scan model of at least a part of the manufactured first physical copy in block 206. The 3D digital scan model may, e.g., comprise the entire manufactured first physical copy. The 3D digital scan model may, e.g., comprise only a part, i.e., a subsection of the manufactured first physical copy. For example, the 3D digital scan model may comprise the first connection portion with the reception, in case the manufactured first physical copy is a physical copy of the first element, e.g., a crown. For example, the 3D digital scan model may comprise the second connection portion with the protrusion, in case the manufactured second physical copy is a physical copy of the second element, e.g., abutment.

In block 208, the scan model provided in block 206 is used to determine deviations of the mechanical connection violating one or more fitting criteria, when replacing the template used for the manufacturing of the first physical copy by the scan model. The scan model is used to establish the mechanical connection with the 3D digital model forming the template not used for manufacturing the first physical copy. In case the manufactured first physical copy is a physical copy of the first element, a scan model resulting from a scan of the manufactured first physical copy is combined with the 3D digital model of the second element in order to check the resulting mechanical connection. In case the manufactured first physical copy is a physical copy of the second element, a scan model resulting from a scan of the manufactured second physical copy is combined with the 3D digital model of the first element in order to check the resulting mechanical connection.

In case no deviation is determined violating a fitting criterium, the method continues with block 214 and the manufacturing of a second physical copy using the unused template. The second physical copy may be manufactured using a CAM-method, e.g., machining or 3D printing. In case the manufactured first physical copy is a physical copy of the first element, the 3D digital model of the second element may be used as a second unused template to manufacture a second physical copy of the second element. In case the manufactured first physical copy is a physical copy of the second element, the 3D digital model of the first element may be used as a first unused template to manufacture a second physical copy of the first element. Thus, in case none of the deviations, i.e., manufacturing inaccuracies, of the manufactured first physical copy results in a violation of a fitting criterium, the manufacturing precision of the first copy is sufficient such hat no compensations by modifying the template for manufacturing the second physical copy are necessary.

In case the manufactured first physical copy comprises no deviations resulting in a violation of a fitting criterium in view of a combination with the unused template, chances are high that in view of a combination with the second physical copy manufactured using the unused template, the manufactured first physical copy may as well comprise no deviations resulting in a violation of a fitting criterium.

Furthermore, the fitting of the manufactured first and second physical copy may be checked. In case, the fit is insufficient, i.e., deviations of the second physical copy from the respective template due to manufacturing inaccuracies exceed per se or in combination with deviations of the first physical copy a fitting criterium, the first and/or second physical copy may be modified such that the fitting criteria are satisfied. For example, the second physical copy may be scanned as well resulting in a second 3D scan model of at least a part of the manufactured second physical copy.

The second 3D digital scan model may, e.g., comprise the entire manufactured second physical copy. The second 3D digital scan model may, e.g., comprise only a part, i.e., a subsection of the manufactured second physical copy. For example, the second 3D digital scan model may comprise the first connection portion with the reception, in case the manufactured second physical copy is a physical copy of the first element, e.g., a crown. For example, the second 3D digital scan model may comprise the second connection portion with the protrusion, in case the manufactured second physical copy is a physical copy of the second element, e.g., abutment.

The two 3D digital scan models may be used to determine deviations of the mechanical connection provided by the two physical copies violating one or more of the fitting criteria. The first and/or second template may be modified in order to compensate deviations. The modified first and/or second template may be used to modify the first and/or second physical copy, e.g., by a subsequent machining. The first and/or second template may be modified by removing one or more parts of the respective template to compensate the determined deviations. The first and/or second modified template may be used to determine machining parameters for the subsequent machining of the manufactured first and/or second physical copy. For example, the first and/or second modified template may be subtracted from the templates used for manufacturing the first and/or second physical copy. The resulting differences may be used to determine the respective machining parameters.

Alternatively, e.g., the in case the deviation cannot be compensated using a subsequent machining, the first and/or second physical copy may be re-manufactured using the first and/or second modified template.

In case one or more deviations are determined to violate a fitting criterium, the method continues with block 210 and the compensating of the determined deviations of the mechanical connection such that the one or more violated fitting criteria are satisfied. The compensating may comprises modifying the template not used for manufacturing the first physical copy.

For example, the mechanical connection, when being established, may define a relative position of the second element with respect to the first element. The fitting criteria may comprise a first maximum value for deviations of the second element from the defined relative position. Thus, in case the first maximum value for deviations of the second element from the position relative to the first element is exceeded, the form of the second physical copy may be adjusted such that the relative position of the second element to the first element, when establishing the mechanical connection, is re-adjusted such that all the remaining deviations are smaller than or equal to the first maximum value.

For example, the mechanical connection, when being established, defines a relative orientation of the second element with respect to the first element. The fitting criteria may comprise a second maximum value for deviations of the second element from the defined relative orientation. Thus, in case the second maximum value for deviations of the second element from the orientation relative to the first element is exceeded, the form of the second physical copy may be adjusted such that the relative orientation of the second element to the first element, when establishing the mechanical connection, is re-adjusted such that all the remaining deviations are smaller than or equal to the second maximum value.

The determining of the deviations of the mechanical connection may be restricted to selected sections of the mechanical connection. For example, first and second sections may be selected pairwise. The first and second section of each pair comprising a first and second surface facing each other. Thus, deviations may, e.g., be analyzed for first and second surface facing each other.

For example, the mechanical connection, when being established, defines a clearance between the first and second connection portion. The clearance may, e.g., be required for inserting an adhesive between the two elements of the dental prosthetic assembly in order to bond the two elements together. The fitting criteria may require a minimum value of the clearance in order to ensure a sufficient minimum dimension of the clearance. The deviations of the mechanical connection with respect to the clearance may, e.g., be determined between selected first and second sections of the templates.

For example, the fitting criteria may further comprise a maximum value of the clearance in order to ensure that the clearance does not become too large.

For example, not only deviations of the mechanical connection violating fitting criteria may be determined. In addition, one or more fitting criteria may be defined for the manufactured first physical copy per se. Thus, deviations of the manufactured first physical copy from the template used for the manufacturing of the first physical copy violating such fitting criteria, may be determined. Such fitting criteria may, e.g., comprising a maximum value for deviations of the manufactured first physical copy from the template.

For example, fitting criteria may be position depending. Thus, at different positions different fitting criteria may be defined. In particular, at different positions different threshold values may be defined by the fitting criteria.

In block 212, a second physical copy is manufactured using the modified template resulting from block 210. Since the second physical copy is manufactured using the modified template, inaccuracies resulting from the manufacturing of the first copy may be compensated directly, when manufacturing the second physical model. Thus, chances may be high that a combination of the first physical copy with the second physical copy may be free of deviations resulting in a violation of a fitting criterium.

Furthermore, the fitting of the manufactured first and second physical copy may be checked as described above in view of block 214. In case that a further compensating is required, the respective compensation may be restricted to a minimum, since deviations resulting from inaccuracies in the manufacturing of the first physical copy have already been taken into account.

Figure 2:
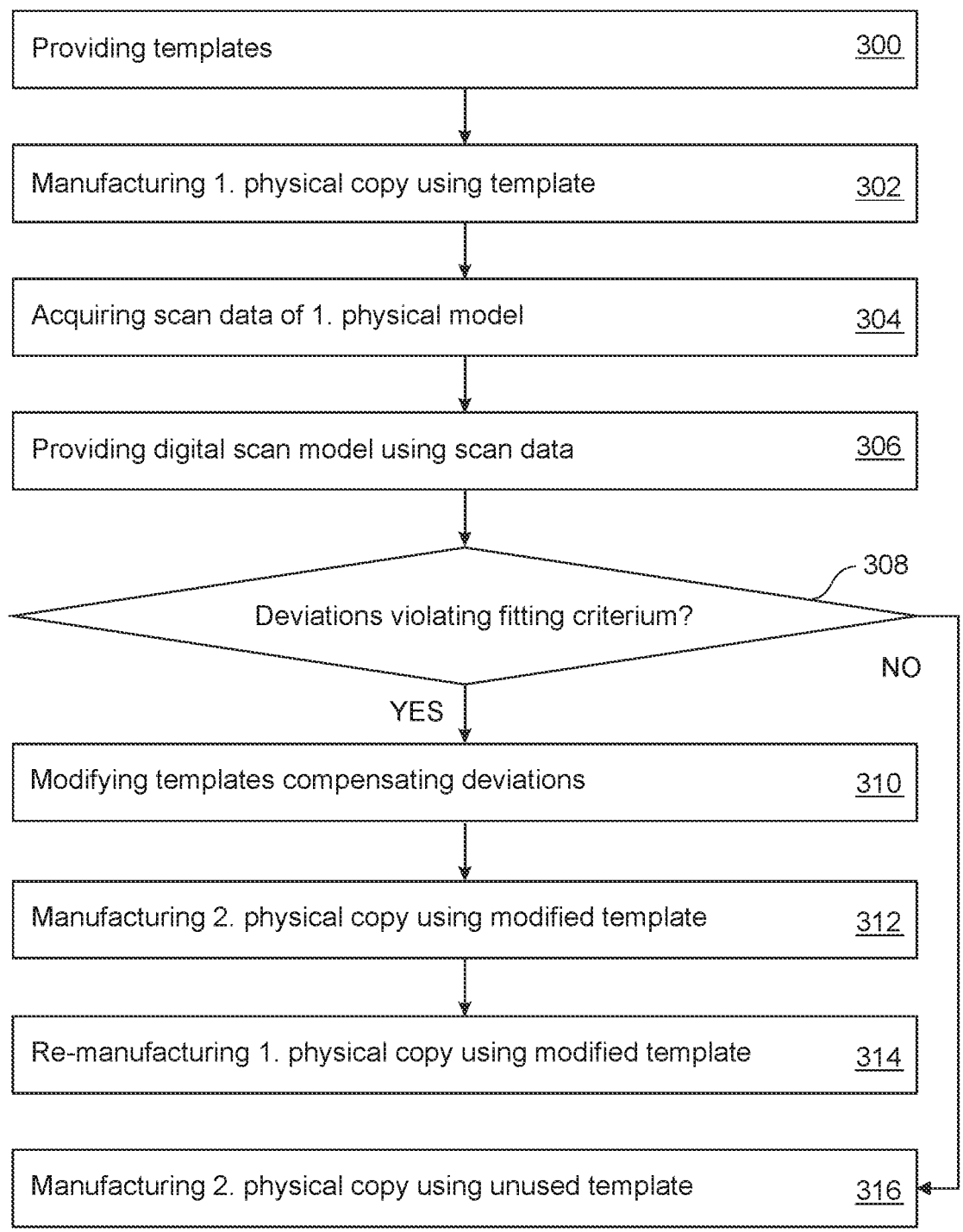
FIG. 2 shows a flowchart illustrating an exemplary method for manufacturing a dental prosthetic assembly.

FIG. 2 shows a flowchart illustrating a further exemplary method for manufacturing a dental prosthetic assembly. Blocks 300 to 308 and 316 of FIG. 2 correspond to blocks 200 to 208 and 214 of FIG. 1. In case one or more deviations of the mechanical connection in block 308 are determined to violate a fitting criterium, the method continues with block 310. In block 310 both templates, i.e., the 3D digital model of the first as well as the second element of the dental prosthetic assembly are modified to compensate deviations violating the fitting criteria. The determined deviations of the mechanical connection are compensated such that the one or more violated fitting criteria are satisfied.

The compensating comprises modifying the template not used for manufacturing the first physical copy. In addition, the template used for manufacturing the first physical copy is modified as well to compensate the determined deviations. In block 312, a second physical copy is manufactured using the modified template resulting from block 310. In block 314, the first physical copy is additionally re-manufactured using the additionally modified template. The re-manufactured first physical copy is used to replace the previously manufactured first physical copy. Thus, both physical copies are manufactured and re-manufactured, respectively, in order to compensate deviations of the mechanical connection resulting from inaccuracies of the manufacturing of the first physical copy. By manufacturing the first physical copy, scanning the manufactured first physical copy and analyzing the manufactured first physical copy in view of deviations of the mechanical connection, compensations can already be taken into account, when manufacturing the second physical copy. Thus, in case of problematic deviations a re-manufacturing of the second copy may be avoided by first manufacturing the first physical copy and taking necessary adjustments already into account, when manufacturing the second physical model.

Furthermore, the fitting of the manufactured first and second physical copy may be checked as described above in view of FIG. 1. In case that a further compensating is required, the respective compensation may be restricted to a minimum, since deviations resulting from inaccuracies in the manufacturing of the first physical copy have already been taken into account.

Figure 3:
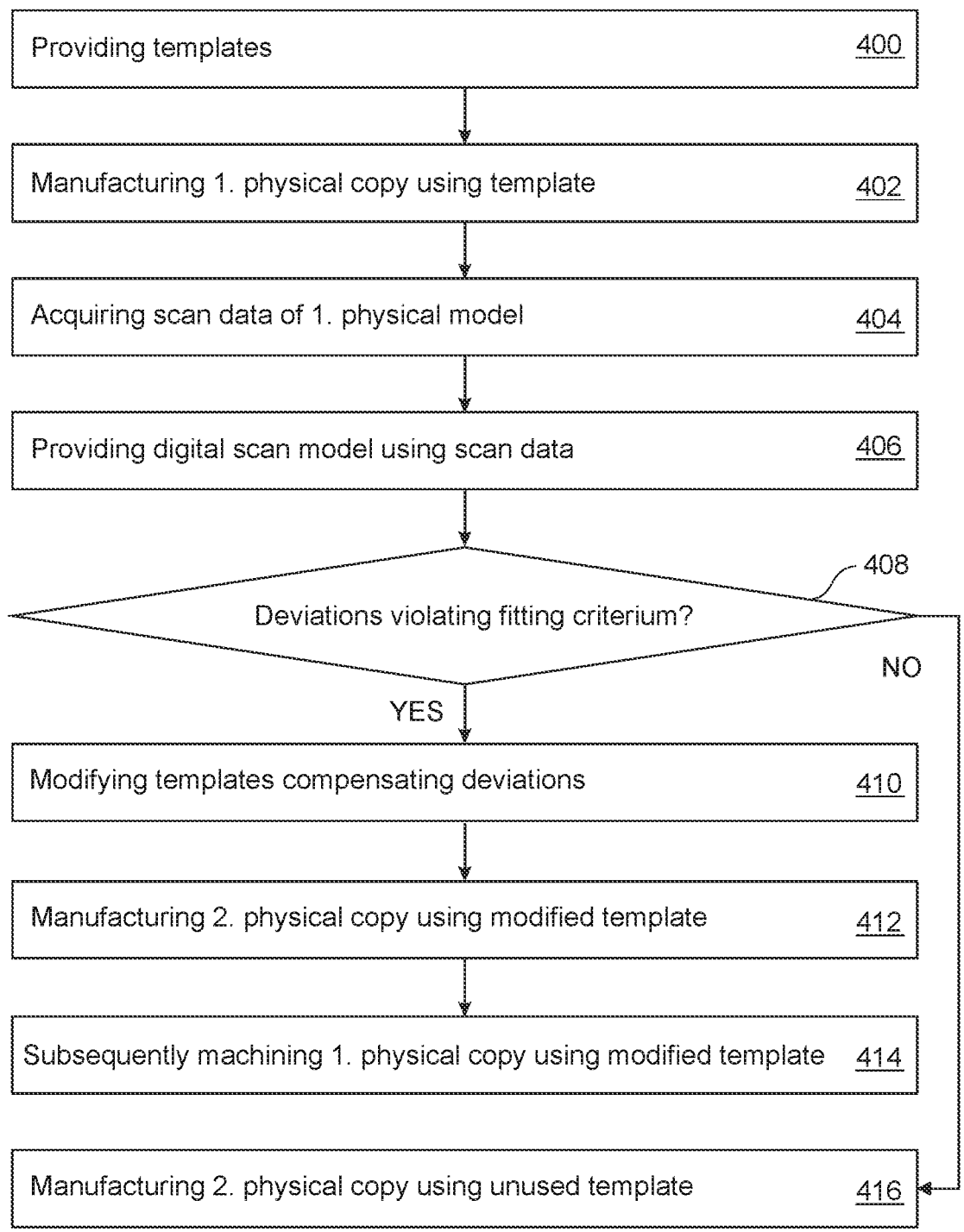
FIG. 3 shows a flowchart illustrating an exemplary method for manufacturing a dental prosthetic assembly.

FIG. 3 shows a flowchart illustrating a further exemplary method for manufacturing a dental prosthetic assembly. Blocks 400 to 408 and 416 of FIG. 3 correspond to blocks 200 to 208 and 214 of FIG. 1. In case one or more deviations of the mechanical connection in block 308 are determined to violate a fitting criterium, the method continues with block 410. In block 410 both templates, i.e., the 3D digital model of the first as well as the second element of the dental prosthetic assembly are modified to compensate deviations violating the fitting criteria. The determined deviations of the mechanical connection are compensated such that the one or more violated fitting criteria are satisfied. The compensating comprises modifying the template not used for manufacturing the first physical copy. In addition, the template used for manufacturing the first physical copy is modified as well to compensate the determined deviations.

In case of FIG. 3, the template used for manufacturing the first physical copy is modified by removing one or more parts of the respective template to compensate the determined deviations. Thus, the respective modifications of the used template can be implemented by a subsequent machining of the manufactured first physical copy without a requirement to re-manufacture the first physical copy. For example, compensation measures which can be implemented by a subsequent machining, i.e., a removing of material, may be applied to the template used for manufacturing the first physical copy, while compensation measures which cannot be implemented by a removal of material may be applied to the unused template. For example, in case a relative position and/or orientation between the first and second element, which has to be adjusted, can be adjusted by removing material, the respective material removal may preferably be applied by modifying the used template. In case, e.g., a clearance between the first and second element has to be extended, the respective extension may preferably be applied by modifying the used template. In case the form of the second physical copy has to be reduced, the respective reduction may be applied by modifying the unused template.

For example, in case a relative position and/or orientation between the first and second element, which has to be adjusted, can be adjusted by adding material, the respective material adding may preferably be applied by modifying the unused template. In case, e.g., a clearance between the first and second element has to be reduced, the respective reduction may preferably be applied by modifying the unused template. In case the form of the second physical copy has to be extended, the respective extension may be applied by modifying the unused template. These modifications may be taken into account, when manufacturing the second physical copy using the modified template, which comprises the respective modifications.

In block 412, a second physical copy is manufactured using the modified template resulting from block 410. In block 414, first physical copy is modified by a subsequent machining using the additionally modified template used for manufacturing the first copy. For the subsequent machining, machining parameters may be determined using the additionally modified template. These machining parameters may be used to compensate the determined deviations by the subsequent machining of the manufactured first physical copy. Thus, both physical copies are manufactured and modified, respectively, in order to compensate deviations of the mechanical connection resulting from inaccuracies of the manufacturing of the first physical copy.

Furthermore, the fitting of the manufactured first and second physical copy may be checked as described above in view of FIG. 1. In case that a further compensating is required, the respective compensation may be restricted to a minimum, since deviations resulting from inaccuracies in the manufacturing of the first physical copy have already been taken into account.

Figure 4:
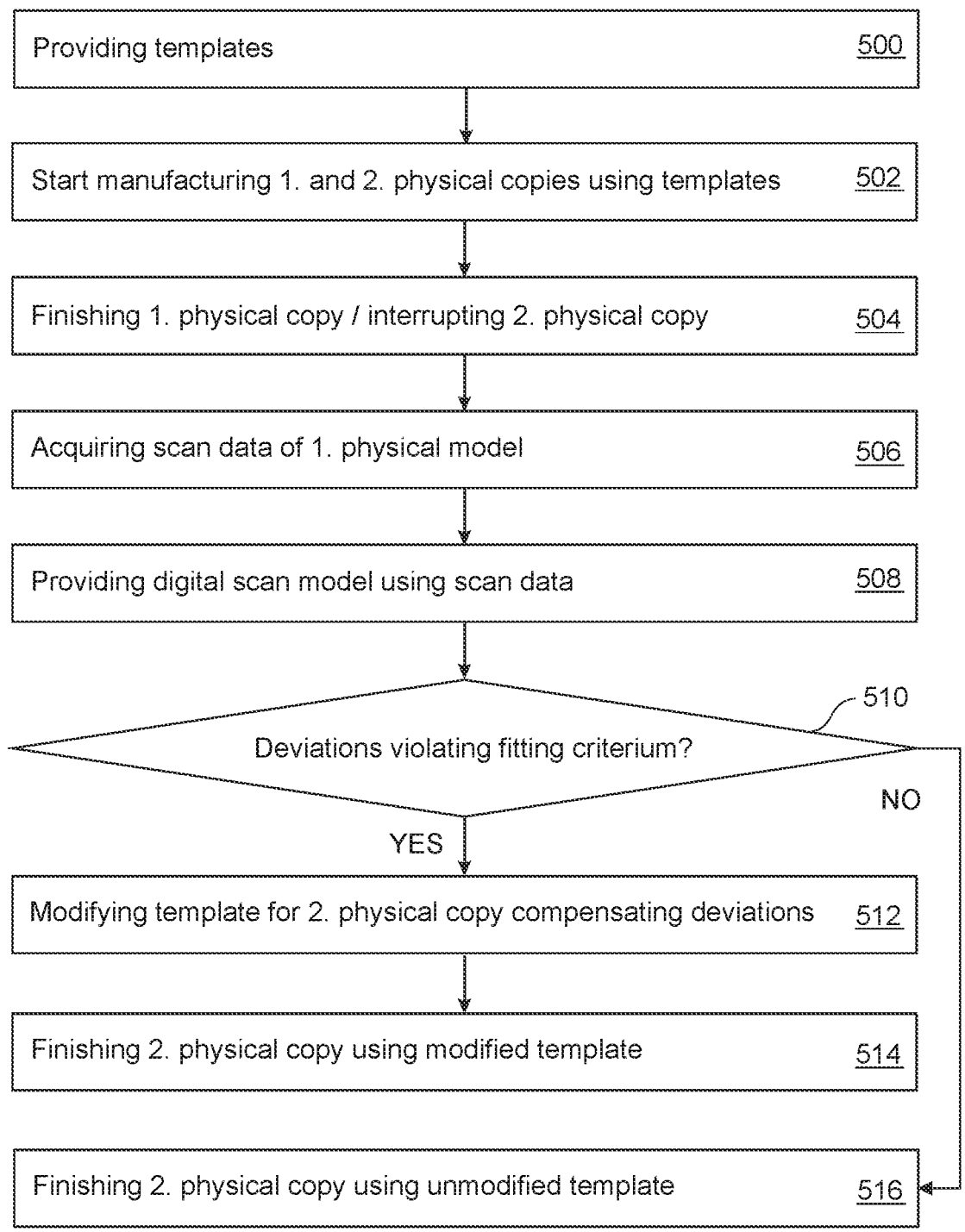
FIG. 4 shows a flowchart illustrating an exemplary method for manufacturing a dental prosthetic assembly.

FIG. 4 shows a flowchart illustrating a further exemplary method for manufacturing a dental prosthetic assembly. In block 500 templates in form of 3D digital models of the elements to be manufactured are provided, e.g., generated. In block 502, a manufacturing of physical copies of both elements of the dental prosthetic assembly, i.e., a first physical copy as well as a second physical copy, are started. The manufacturing may, e.g., be started simultaneously or with a relative time delay. In case of a time delay, the manufacturing of the delayed one of the two physical copies may be started during one of the following process steps: the manufacturing of the other physical copy, an acquiring of scan data of the manufactured other physical copy, the providing of a scan model of the other physical copy, a determining of the deviations of the mechanical connection taking into account the scan model of the other physical copy, a compensating of the determined deviations.

The physical copies may be manufactured using CAM-methods, e.g., machining or 3D printing. Both physical copies may be manufactured using the same method or different methods may be used for the two physical copies. For example, both physical copies may each be manufactured by machining using one or more machining devices or both copies may be printed using one or more 3D printing devices. For example, one of the physical copies may be manufactured by machining using a machining device, while the other copy may be printed using a 3D printing device.

One of the two physical copies is manufactured using one of the two 3D digital models provided in block 500 as a template, while the other 3D digital model provided in block 500 is used as a template for the other physical copy. In block 504, the manufacturing of a first one of the two physical copies is finished, while the manufacturing of the second one of the two physical copies is interrupted. This interruption takes place before the manufacturing of the second one of the two physical copies is finished, i.e., at an intermediate state. In such an intermediate state, the form of the second one of the two physical copies does not yet match the form of the corresponding template. For example, in case of 3D printing, the printing may be interrupted before a predefined number of final layers has been printed. Thus, a predefined number of final layers may be missing. For example, at least in some sections of the template a minimum distance to a final surface is defined. By subtracting the minimum distance, at least within some section of the template, from the form defined by the template a reduced form may be defined. For example, the manufacturing of the second one of the two physical copies is interrupted as soon as the reduced form is reach or as soon as the reduced form is reach in a predefined section of the second one of the two physical copies.

For example, in case of machining, the machining may be interrupted before a predefined final amount of material has been removed from the blank being machined. Thus, a predefined amount of material remains, which would have to be removed order to achieve a form matching the form of the respective template. For example, a minimum additional thickness may be defined at least in some sections of the template. By adding the minimum additional thickness, at least within some section of the template, to the form defined by the template a rough extended form may be defined. For example, the manufacturing of the second one of the two physical copies is interrupted as soon as the extended form is reach or as soon as the extended form is reach in a predefined section of the second one of the two physical copies.

A main difference between the methods illustrated in FIG. 1 to 3 and the method of FIG. 4 is that according to FIG. 4 the manufacturing of the second physical copy is started before potential modifications of the template of the second one of the two physical copies are determined. Thus, a template is used for starting the manufacturing of the second one of the two physical copies which may have to be modified to provide a final template for finishing the second one of the two physical copies. The dimension of the modification may be estimated to lie within a range defined by the inaccuracies of the manufacturing method and/or manufacturing device being used. The manufacturing of the second one of the two physical copies is interrupted at an intermediate state. Differences between the intermediate state and state defined by the unmodified template may be selected to be large enough to allow for any modification within the range defined by the inaccuracies of the manufacturing method and/or manufacturing device being used. Allowing for any modification means that continuing the manufacturing with the intermediate state any final state defined by a modified template may be achievable with the modified template being modified using modification within the range defined by the inaccuracies of the manufacturing method and/or manufacturing device being used.

Blocks 506 through 512 of FIG. 4 correspond, e.g., to blocks 204 through 210 of FIG. 1. In block 506, scan data of the finished first one of the physical copies is acquired. The acquired scan data is used in block 508 to provide a 3D digital scan model of at least a part of the manufactured first physical copy. In block 510 it is determined using the scan model, whether based on the finished first one of the physical copies deviations of the mechanical connection are present violating one or more fitting criteria. For this purpose, the template used for the manufacturing of the first physical copy is replaced by the scan model for establishing the mechanical connection with the template of the second one of the first physical copies. In case no deviations violating a fitting criterium are determined, the method continues in block 516. In block 516, the second one of the first physical copies is finished using the unmodified template, which has already been used for starting the manufacturing of the second one of the first physical copies.

In case one or more deviations violating a fitting criterium are determined, the method continues in block 512. In block 512, the template used for manufacturing the intermediate state of the second one of the first physical copies is modified. Thus, the determined deviations of the mechanical connection may be compensated to satisfy the one or more violated fitting criteria. Upon finishing the modifying of the template used for manufacturing the intermediate state of the second one of the first physical copies, the interrupted manufacturing of the second physical copy is continued in block 514 using the modified template to finalize the manufacturing of the second one of the first physical copies.

Thus, the only difference in comparison to the method of FIG. 1 may be that the manufacturing of the second one of the first physical copies using the modified template is not started in block 514, like in block 212 of FIG. 1, but is rather continued using the intermediated state. The same holds true for block 516, in which the manufacturing of the second one of the first physical copies using the unmodified template is not started, but rather continued using the intermediate state.

Furthermore, the fitting of the manufactured first and second physical copy may be checked as described above in view of FIG. 1. In case that a further compensating is required, the respective compensation may be restricted to a minimum, since deviations resulting from inaccuracies in the manufacturing of the first physical copy have already been taken into account.

Figure 5:
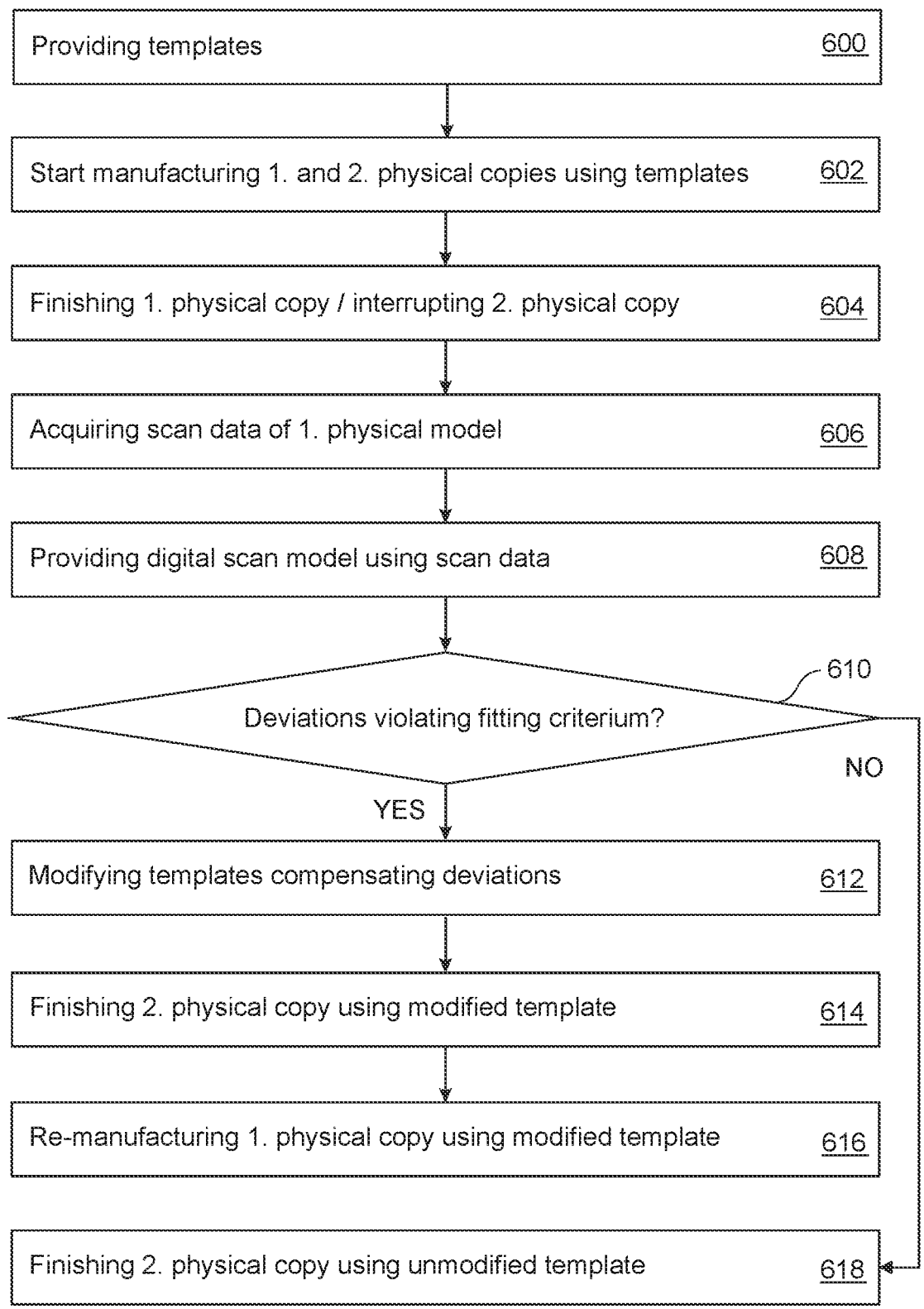
FIG. 5 shows a flowchart illustrating an exemplary method for manufacturing a dental prosthetic assembly.

FIG. 5 shows a flowchart illustrating a further exemplary method for manufacturing a dental prosthetic assembly. Blocks 600 to 610 and 618 of FIG. 5 correspond to blocks 500 to 510 and 518 of FIG. 4. In case one or more deviations of the mechanical connection in block 610 are determined to violate a fitting criterium, the method of FIG. 5 continues with block 612. In block 612 both templates, i.e., the 3D digital model of the first element as well as the 3D digital model of the second element of the dental prosthetic assembly are modified to compensate deviations violating the fitting criteria. Thereby, the determined deviations of the mechanical connection are compensated such that the one or more violated fitting criteria are satisfied.

The compensating comprises modifying the template used for manufacturing the second one of the physical copies, i.e., of the physical copy in the intermediate state, as in block 512 of FIG. 4. In addition, the template used for manufacturing the first one of the physical copies, i.e., the finalized physical copy, is modified as well in order to compensate the determined deviations. The first one of the physical copies is considered to finalized in view of the first template used to manufacture the respective physical copy. It is finalized, when the copying process is completed and all the features defined by the respective template have been implemented in the respective physical copy. Nevertheless, in case of a subsequent modification of the template, further modifications of the respective the physical copy may be necessary in order to implement the new features defined by the modified template in the physical copy.

In block 614, the interrupted manufacturing of the second physical copy is continued using the modified template for this second copy resulting from block 612 to finalize the manufacturing of the respective second one of the first physical copies. Thus, the only difference in comparison to the method of FIG. 2 may be that the manufacturing of the second one of the first physical copies using the modified template is not started in block 614, like in block 312 of FIG. 2, but is rather continued using the intermediated state. The same holds true for block 618, in which the manufacturing of the second one of the first physical copies using the unmodified template is not started, but rather continued using the intermediate state.

In block 616, the first one of the physical copies is additionally re-manufactured using the additionally modified template. The re-manufactured first physical copy is used to replace the previously manufactured first physical copy. Thus, both physical copies are continued to be manufactured and re-manufactured, respectively, in order to compensate deviations of the mechanical connection resulting from inaccuracies of the manufacturing of the first physical copy. By manufacturing the first physical copy, scanning the manufactured first physical copy and analyzing the manufactured first physical copy in view of deviations of the mechanical connection, compensations can be taken into account, when finishing the manufacturing the second physical copy. Thus, in case of problematic deviations a re-manufacturing of the second copy may be avoided by first manufacturing the first physical copy and taking necessary adjustments already into account, when finishing the manufacturing the second physical model.

Furthermore, the fitting of the manufactured first and second physical copy may be checked as described above in view of FIG. 1. In case that a further compensating is required, the respective compensation may be restricted to a minimum, since deviations resulting from inaccuracies in the manufacturing of the first physical copy have already been taken into account.

Figure 6:
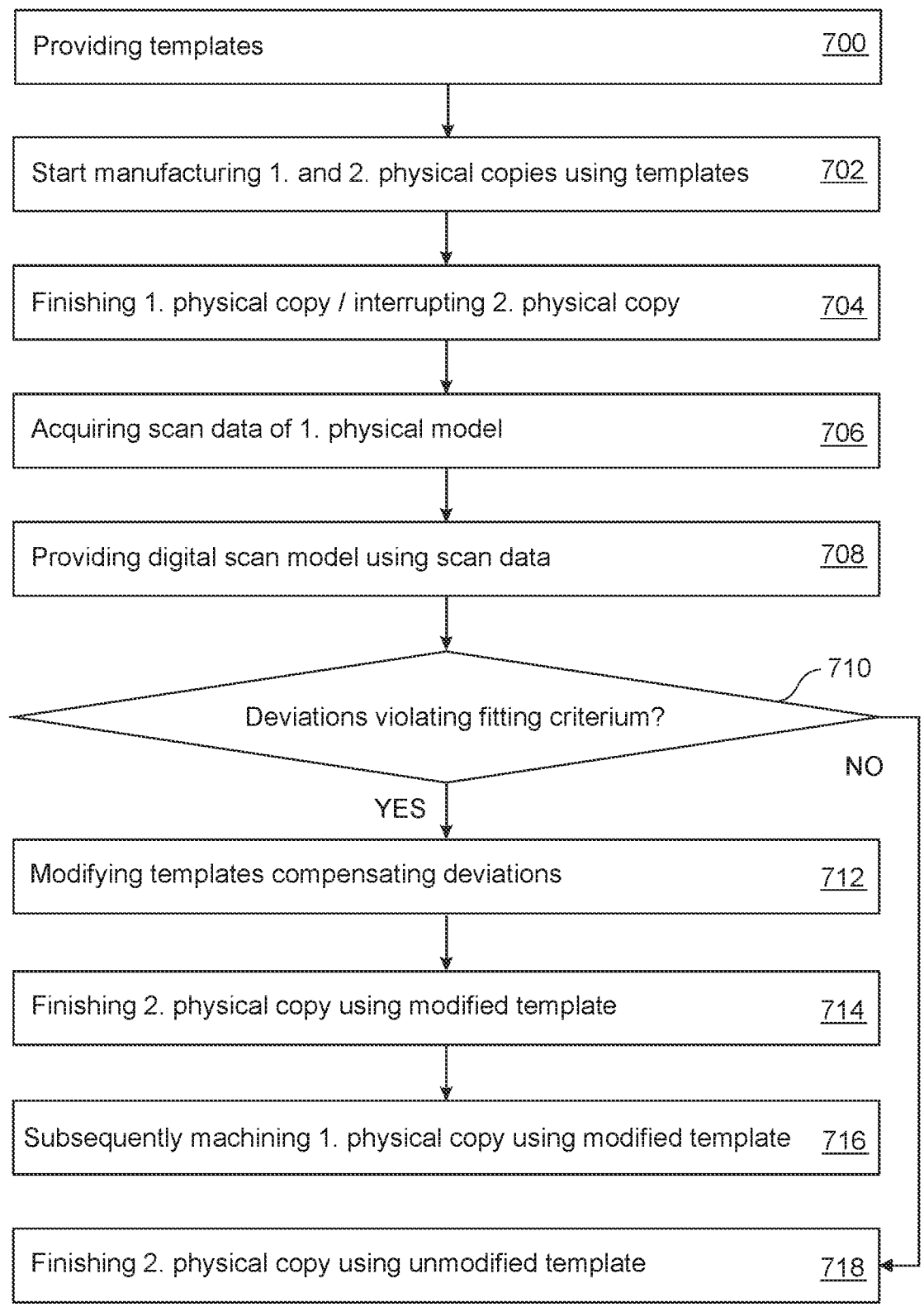
FIG. 6 shows a flowchart illustrating an exemplary method for manufacturing a dental prosthetic assembly.

FIG. 6 shows a flowchart illustrating a further exemplary method for manufacturing a dental prosthetic assembly. Blocks 700 to 714 and 718 of FIG. 6 correspond to blocks 600 to 614 and 618 of FIG. 5.

In case of FIG. 6, the template used for manufacturing the first physical copy is modified by removing one or more parts of the respective template to compensate the determined deviations. Thus, the respective modifications of the respective template can be implemented by a subsequent machining of the manufactured first physical copy without a requirement to re-manufacture the first physical copy. For example, compensation measures which can be implemented by a subsequent machining, i.e., a removing of material, may be applied to the template used for manufacturing the first physical copy, while compensation measures which cannot be implemented by a removal of material may be applied to the template used to manufacture the intermediate state of the second one of the physical copies.

For example, in case a relative position and/or orientation between the first and second element, which has to be adjusted, can be adjusted by removing material, the respective material removal may preferably be applied by modifying the template used for manufacturing the first physical copy. In case, e.g., a clearance between the first and second element has to be extended, the respective extension may preferably be applied by modifying the template used for manufacturing the first physical copy. In case the form of the second physical copy has to be reduced, the respective reduction may be applied by modifying the template used to manufacture the intermediate state of the second one of the physical copies. For example, when finishing the second one of the physical copies, no further or less material than planned by the original template may be removed. This amendment may be implemented by modifying the respective template used for manufacturing the second one of the physical copies.

For example, in case a relative position and/or orientation between the first and second element, which has to be adjusted, can be adjusted by adding material, the respective material adding may preferably be applied by modifying the template used to manufacture the intermediate state of the second one of the physical copies. In case, e.g., a clearance between the first and second element has to be reduced, the respective reduction may preferably be applied by modifying the template used to manufacture the intermediate state of the second one of the physical copies. In case the form of the first physical copy has to be extended, the respective extension may be applied by modifying the template used to manufacture the intermediate state of the second one of the physical copies. These modifications may be taken into account, when finishing the manufacturing of the second one of the physical copies using a modified template, which comprises the respective modifications.

In block 714, the interrupted manufacturing of the second physical copy is continued using the modified template for this second copy resulting from block 712 to finalize the manufacturing of the respective second one of the first physical copies. Thus, the only difference in comparison to the method of FIG. 2 may be that the manufacturing of the second one of the first physical copies using the modified template is not started in block 714, like in block 312 of FIG. 2, but is rather continued using the intermediated state. The same holds true for block 718, in which the manufacturing of the second one of the first physical copies using the unmodified template is not started, but rather continued using the intermediate state.

In block 716, the first one of the physical copies is modified by a subsequent machining using the additionally modified template used for manufacturing the first copy. For the subsequent machining, machining parameters may be determined using the additionally modified template. These machining parameters may be used to compensate the determined deviations by the subsequent machining of the manufactured first physical copy. Thus, both physical copies are manufactured and modified, respectively, in order to compensate deviations of the mechanical connection resulting from inaccuracies of the manufacturing of the first physical copy.

Furthermore, the fitting of the manufactured first and second physical copy may be checked as described above in view of FIG. 1. In case that a further compensating is required, the respective compensation may be restricted to a minimum, since deviations resulting from inaccuracies in the manufacturing of the first physical copy have already been taken into account.

Figure 7:
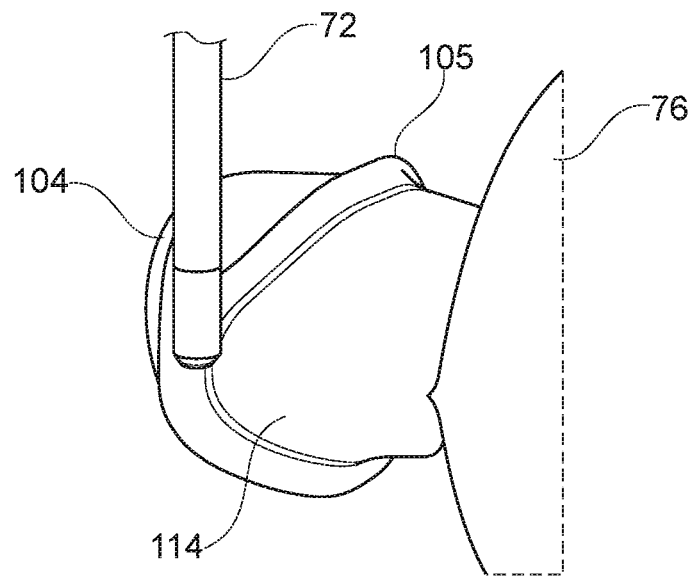
FIG. 7 shows an exemplary abutment being manufactured by machining.

FIG. 7 shows an exemplary element 104 of a dental prosthetic assembly being manufactured by machining. The exemplary element 104 may, e.g., be an abutment. For example, a blank 76 is provided and machined using one or more machining tools 72 according to machining parameters defined according to a template. The template may define a 3D form of the abutment 104 to be manufactured by removing material from the blank 76 using the machining tool 72. The abutment 104 may comprise a protrusion 114 and a rim 105. The protrusion 114 may be configured to be inserted into a reception, e.g., of a crown, when the crown is arranged on the abutment 104. Thus, a mechanical connection may be established between the abutment 104 and, e.g., the crown. The mechanical connection may be established by the reception of the crown receiving the protrusion 114 of the abutment 104. The insertion depth of the protrusion 114 of the abutment 104 may be limited by the rim 105.

Figure 8:
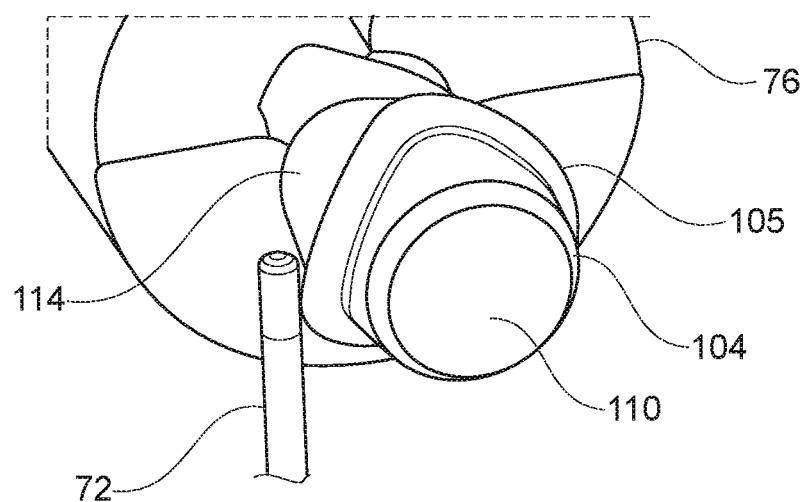
FIG. 8 shows an exemplary abutment being manufactured by machining.

FIG. 8 shows the exemplary abutment 104 of FIG. 7 from another point of view. The abutment 104 may comprise a bottom face 110. This bottom face 110 may be configured for a connection with an implant. For example, a screwing hole may extend through the abutment 104 and the bottom face 110. The screwing hole may be configured for receiving a screw for connecting the abutment 104 to the implant. The bottom face as well as the screwing hole may have no effect on the mechanical connection between the abutment 104 and, e.g., a crown. Therefore, the bottom face 110 and the screwing hole may be neglected for determining potential deviations of the mechanical connection. Since the software knows where exactly the neglected areas, e.g., the screw hole, is in the 3D digital model used as a template for manufacturing the physical copy, like the abutment 104, the software may automatically detect, where the neglected areas are in the milled surface of the physical copy. The detecting may comprise a registration the two digital objects, i.e., of the 3D digital scan model with the 3D digital model used as the template. The registration may, e.g., be an ICP-registration, i.e., a registration using the iterative closest point algorithm to minimize the difference between two clouds of points. Furthermore, the detecting may comprise selecting parts to be neglected in the scan model using a geometric threshold distance to parts defined as being negligible in the template. Parts in the scan model with a geometric distance to negligible parts in the template equal or smaller than the geometric threshold distance may be neglected. The bottom face 110 is depicted as blank face in FIG. 8 and may be considered as a blank face for the purposes of determining potential deviations of the mechanical connection between the abutment 104 and, e.g., the crown. For example, for determine such deviations only the rim 105 and the protrusion 114 of the abutment 104 may be taken into account. Regarding the rim 105, e.g., only a face of the rim 105 facing the crown may be taken into account.

Figure 9:
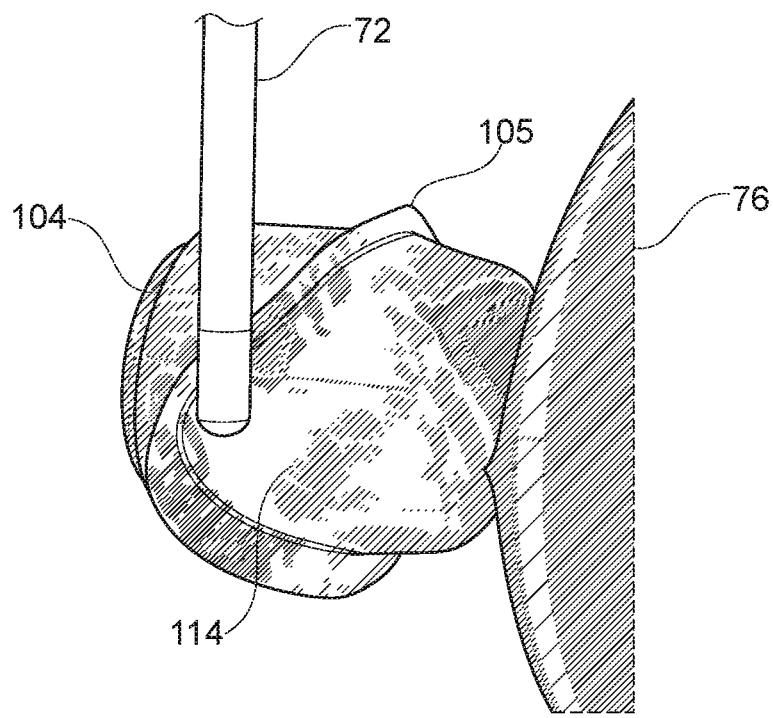
FIG. 9 shows an exemplary abutment being manufactured by machining.

FIG. 9 shows the exemplary abutment 104 of FIG. 7 with deviations of the physical copy of the abutment 104 from the template used for manufacturing the abutment 104 being indicated. For example, the face of the rim 105 facing towards the direction in which the abutment 104 may be inserted into a crown may comprise a deviation 115 from the form defined by the template exceeding a predefined threshold. The deviation 115 of the rim 105 exceeding the predefined threshold may result in a deviation of the mechanical connection between the abutment 104 and, e.g., the crown violating a fitting criterium. This deviation of the mechanical connection resulting from the deviation 115 of the abutment 104 may, e.g., be compensated by modifying a template for the crown. By modifying the template for the crown, the mechanical connection between the abutment 104 and the crown, in particular between the rim 105 and the crown, may be adjusted such that no derivations violating the predefined fitting criteria remain. The crown may be manufactured using the respective modified template.

Figure 10:
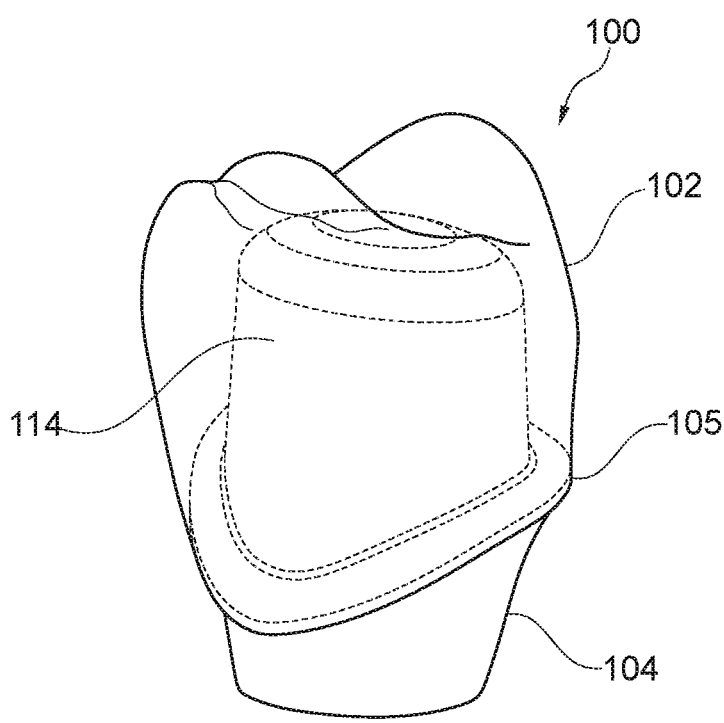
FIG. 10 shows an exemplary dental prosthetic assembly comprising an abutment and a crown.

FIG. 10 shows an exemplary dental prosthetic assembly 100 comprising an abutment 104, like, e.g., the abutment 104 shown in FIG. 7 to 9 as well as and a crown 102. The abutment 104 comprises a protrusion 114, which is configured of be inserted into a reception of the crown 102. In order to establish a mechanical connection between the abutment 104 and the crown 102, the crown 102 may be arranged on the abutment 104, such that the crown 102 receives the protrusion 114. The insertion depth of the protrusion 114 into the crown 102 may be limited by the rim 105 of the abutment.

Figure 11:
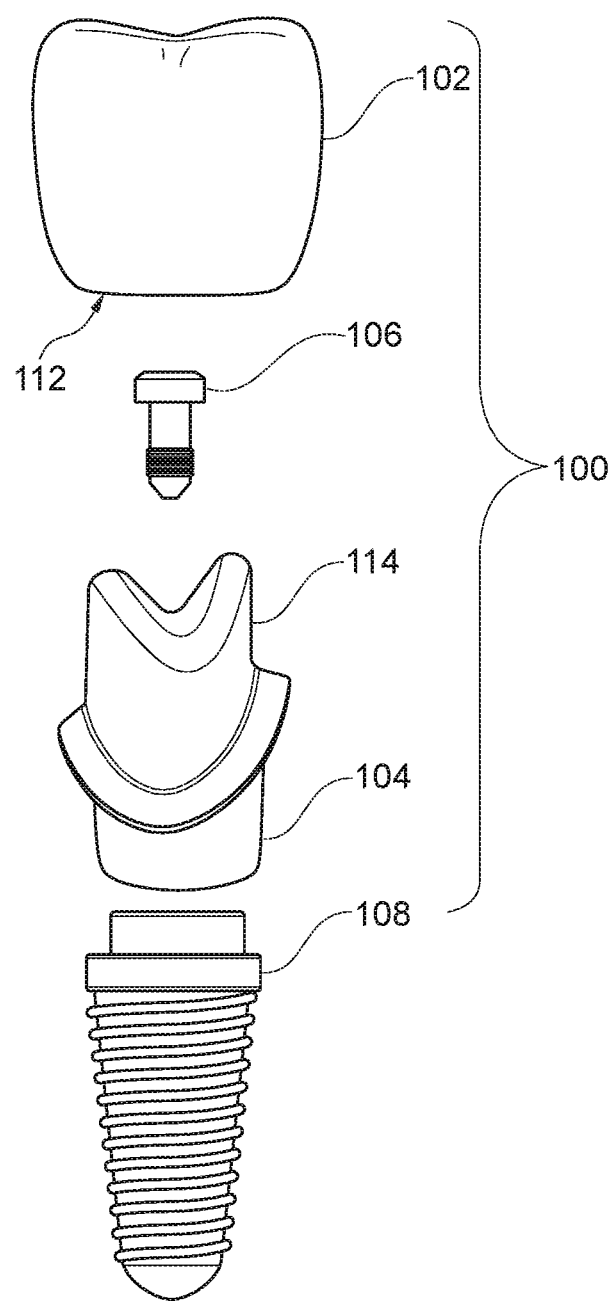
FIG. 11 shows an exemplary dental prosthetic assembly configured to be mounted on an implant using a screw.

FIG. 11 shows exemplary elements 102, 104 of an exemplary dental prosthetic assembly 100 to be mounted onto an implant 108. The implant 108 may be configured to be implanted into a patient's jaw bone. The dental prosthetic assembly 100 may be configured to be mounted on the implant using a screw 106. The screw 106 may be tightened to a predetermined torque with a dental torque wrench, in order to avoid screw loosening, e.g., during chewing. The crown 102 may be arranged on the abutment 104, by inserting the protrusion 114 of the abutment 104 into the reception 112 of the crown 102. For example, the screw 106 may be used to fasten the abutment 104 to the implant 108 before or after establishing a mechanical connection between the abutment 104 and the crown 102, i.e., arranging the crown 102 on the abutment 102. In case the screw 106 is fasten after establishing a mechanical connection, the crown 102 may comprise a channel configured for inserting a screwdriver, e.g., a dental torque wrench, and/or the screw 106. the mechanical connection, when being established, may a clearance between the crown 102 and the abutment 104. This clearance may be configured to receive an adhesive, e.g., dental cement, in order to avoid a loosening of the crown, e.g., during chewing. Thus, a permanent bonding between the crown 102 and the abutment may be established.

Figure 12:
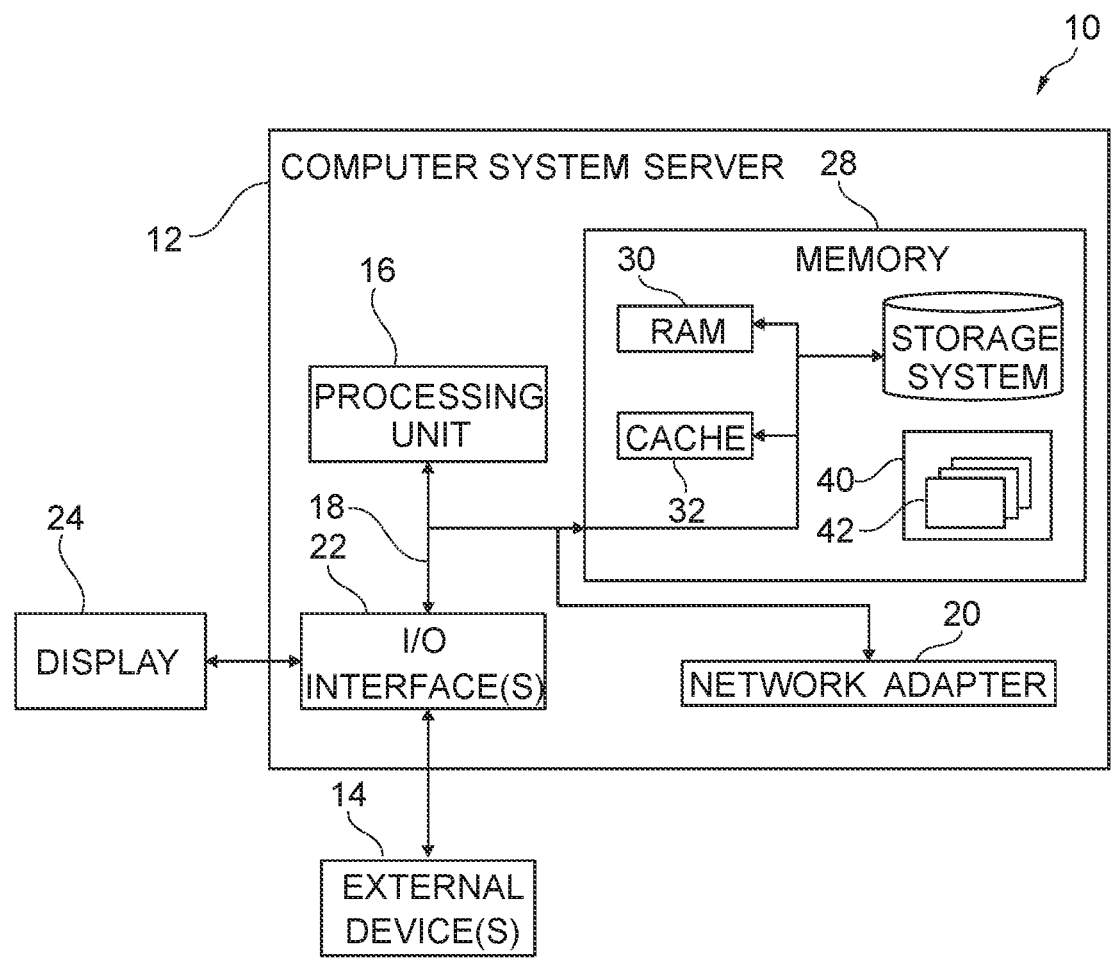
FIG. 12 shows an exemplary computer system for manufacturing a dental prosthetic assembly.

FIG. 12 shows a schematic diagram of an exemplary computer system 10 usable for manufacturing a dental prosthetic assembly. The computer system 10 may be operational with numerous other general-purpose or special-purpose computing system environments or configurations. Computer system 10 may be described in the general context of computer system executable instructions, such as program modules comprising executable program instructions, being executable by the computer system 10. Generally, program modules may include routines, programs, objects, components, logic, data structures, and so on that perform particular tasks or implement particular abstract data types. Computer system 10 may be practiced in distributed computing environments where tasks are performed by remote processing devices that are linked through a communications network. In a distributed computing environment, program modules may be located in both local and remote computer system storage media including memory storage devices.

In FIG. 12, computer system 10 is shown in the form of a general-purpose computing device. The components of computer system 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 10 may comprise a variety of computer system readable storage media. Such media may be any available storage media accessible by computer system 10, and include both volatile and non-volatile storage media, removable and non-removable storage media.

A system memory 28 may include computer system readable storage media in the form of volatile memory, such as random-access memory (RAM) 30 and/or cache memory 32. Computer system 10 may further include other removable/non-removable, volatile/non-volatile computer system storage media. For example, storage system 34 may be provided for reading from and writing to a non-removable, non-volatile magnetic media also referred to as a hard drive.

For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may include at least one program product having a set of program modules, e.g., at least one program module, configured for executing one or more steps of the method for manufacturing dental prosthetic assemblies. The respective program module may, e.g., be configured for providing, e.g., generating, 3D digital models of elements of dental prosthetic assemblies, for providing digital 3D scan models of manufactured physical copies of elements of dental prosthetic assemblies, for determining deviations of mechanical connections between elements of dental prosthetic assemblies violating one or more fitting criteria, for compensating deviations violating fitting criteria by modifying templates.

Program 40 may have a set of one or more program modules 42 and by way of example be stored in memory 28. The program modules 42 may comprise an operating system, one or more application programs, other program modules, and/or program data. Each of the operating system, one or more application programs, other program modules, and program data or some combination thereof, may include an implementation of a networking environment. One or more of the program modules 42 may enable an execution of one or more steps of the method for manufacturing dental prosthetic assemblies.

Computer system 10 may further communicate with one or more external devices 14 such as a keyboard, a pointing device, like a mouse, and a display 24 enabling a user to interact with computer system 10. Such communication can occur via input/output (I/O) interfaces 22. Computer system 10 may further communicate with one or more networks such as a local area network (LAN), a general wide area network (WAN), and/or a public network, like the Internet, via network adapter 20. Network adapter 20 may communicate with other components of computer system 10 via bus 18. It should be understood that although not shown, other hardware and/or software components could be used in conjunction with computer system 10.

The computer system 10 shown in FIG. 12 may be configured for executing one or more steps of the method for manufacturing dental prosthetic assemblies. The respective computer system 10 may, e.g., be configured for providing, e.g., generating, 3D digital models of elements of dental prosthetic assemblies, for providing digital 3D scan models of manufactured physical copies of elements of dental prosthetic assemblies, for determining deviations of mechanical connections between elements of dental prosthetic assemblies violating one or more fitting criteria, for compensating deviations violating fitting criteria by modifying templates. The respective computer system 10 may furthermore be configured for providing control parameters for controlling a manufacturing of elements of dental prosthetic assemblies.

These control parameters may, e.g., be used by the computer system 10 to control one or more manufacturing devices, like, e.g., one or more machining devices and/or one or more 3D printing devices. The respective computer system 10 may furthermore be configured to control one or more scan devices configured for acquiring scan data of physical copies of elements of dental prosthetic assemblies. The computer system 10 may be a standalone computer with no network connectivity that may receive data to be processed through a local interface. The data received by computer system 10 may for example comprise 3D digital models of elements of dental prosthetic assemblies and/or scan data of physical copies of elements of dental prosthetic assemblies. For example, the computer system 10 may be used to generate 3D digital models of elements of dental prosthetic assemblies. Such operation may, however, likewise be performed using a computer system that is connected to a network such as a communications network and/or a computing network.

Figure 13:
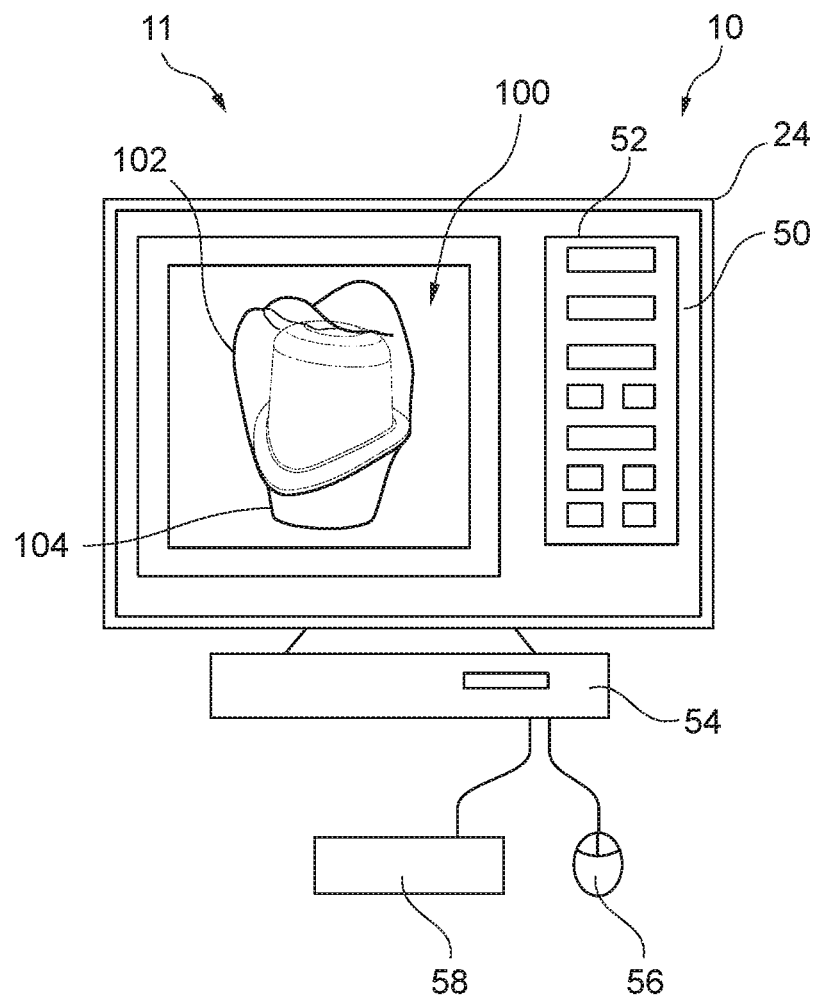
FIG. 13 shows an exemplary computer system for manufacturing a dental prosthetic assembly.

FIG. 13 shows an exemplary system 11 comprising a computer system 10 for executing steps of the method for manufacturing dental prosthetic assemblies 100. The computer system 10 may, e.g., be configured as shown in FIG. 12. The computer system 10 may comprise a hardware component 54 comprising one or more processors as well as a memory storing machine-executable program instructions. Execution of the program instructions by the one or more processors may cause the one or more processors to control the computer system 10 to execute one or more steps of the method for manufacturing a dental prosthetic assembly 100. The dental prosthetic assembly 100 may comprise a first and a second element 102, 104. As an example for a first element 102 of a dental assembly 100, FIG. 13 depicts a crown. As an example for a second element 104 of a dental assembly 100, FIG. 13 depicts an abutment. The first element 102 may comprise a first connection portion with a reception configured to establish a mechanical connection between the first and the second element 102, 104 by receiving a protrusion of a second connection portion comprised by the second element 104.

The method may comprise providing, e.g., generating a first 3D digital model of the first element 102 as a first template and a second 3D digital model of the second element 104 as a second template. A first physical copy of the first element 102 may be manufactured using the first template or of the second element 104 using the second template. Scan data of the manufactured first physical copy may be acquired. A 3D digital scan model of at least a part of the manufactured first physical copy may be provided using the scan data. Using the scan model deviations of the mechanical connection violating one or more fitting criteria may be determined, when replacing for establishing the mechanical connection the template used for the manufacturing of the first physical copy by the scan model. The determined deviations of the mechanical connection may be compensated to satisfy the one or more violated fitting criteria. The compensating may comprise modifying the template not used for manufacturing the first physical copy. A second physical copy may be manufactured using the modified template.

The computer system 10 may further comprise one or more input devices, like a keyboard 54 and a mouse 56, enabling a user to interact with the computer system 10. Furthermore, the computer system 10 may comprise one or more output devices, like a display 24 providing a graphical user interface 50 with control elements 52, e.g., GUI elements, enabling the user to control a generating of 3D digital models of the elements 102, 104 of the dental prosthetic assembly 100 and/or a manufacturing of the elements 102, 104 of the dental prosthetic assembly 100.

Figure 14:
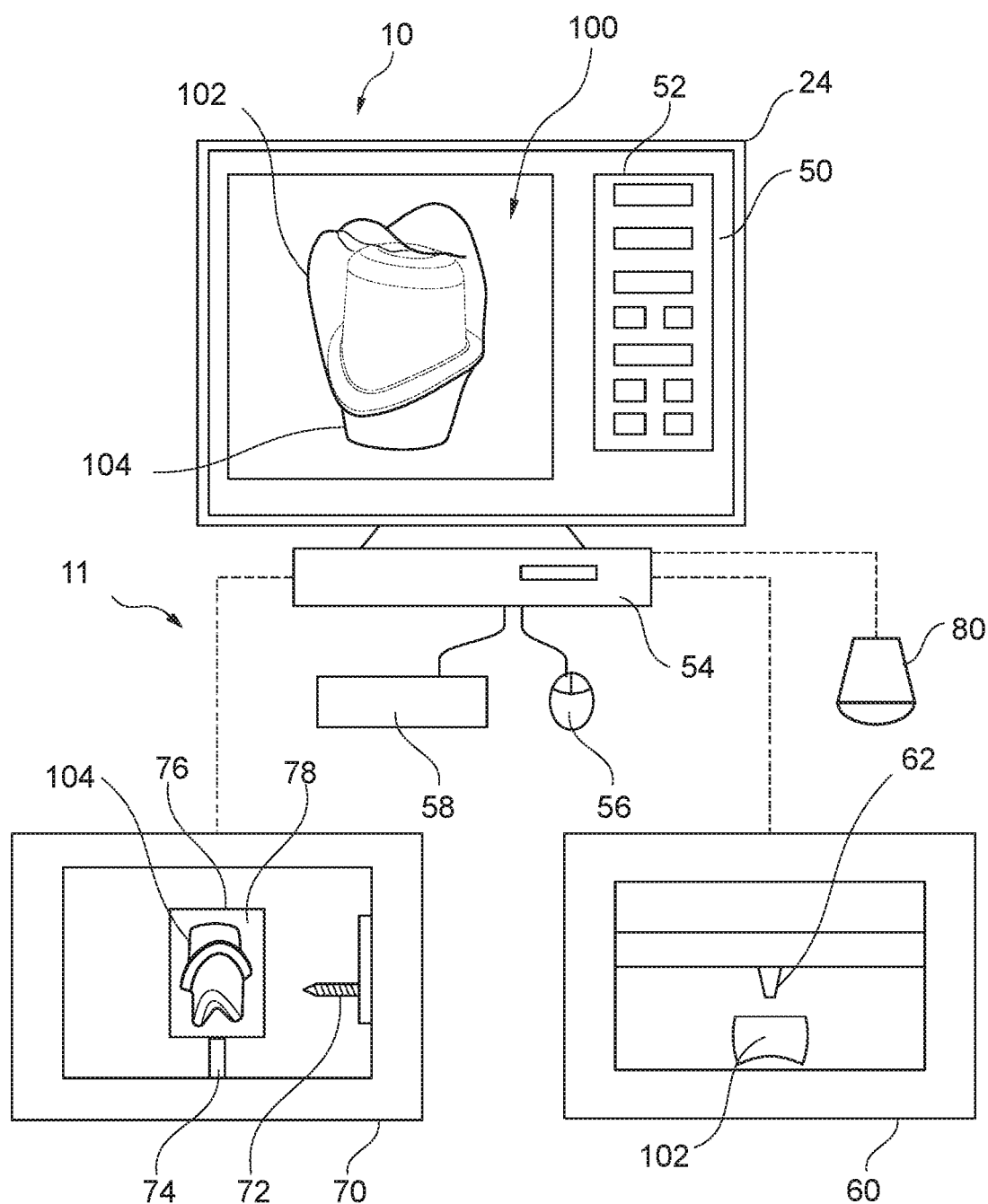
FIG. 14 shows an exemplary system for manufacturing a dental prosthetic assembly.

FIG. 14 shows an exemplary system 11 for manufacturing a dental prosthetic assembly 100 comprising a first element 102, e.g., a crown, and a second element 104, e.g., an abutment. The system 11 may comprise the computer system 10 of FIG. 13. The computer system 10 may further be configured to control one or more manufacturing devices 60, 70. For example, the system 11 may comprise a manufacturing device in form of a machining device 70 controlled by the computer system 10. The machining device 70 may be configured to machining a blank 76 using one or more machining tools 72. The blank 76 of raw material 78 may be provided using a holding device 74 and cut into a desired final shape and size of the dental element to be manufactured, e.g., the first and/or second element 102, 104 of the dental prosthetic assembly 100, using the one or more machining tools 72 for executing a controlled material-removal process. The machining tool 72 may, e.g., be a milling tool. Digital 3D models, e.g., the first and/or second element 102, 104, may provide templates of the dental elements manufactured using the machining device 70, e.g., the first and/or second element 102, 104 of the dental prosthetic assembly 100.

For example, the system 11 may comprise a manufacturing device in form of a 3D printing device 60. The 3D printing device 60 may be controlled by the computer system 10 and configured to print one or more dental element to be manufactured, e.g., the first and/or second element 102, 104 of the dental prosthetic assembly 100. The 3D printing device 60 may comprise a printing element 62 configured to print the respective dental element, like the first and/or second element 102, 104, layer by layer. Digital 3D models, e.g., the first and/or second element 102, 104, may provide templates of the dental elements manufactured using the 3D printing device 60, e.g., the first and/or second element 102, 104 of the dental prosthetic assembly 100.

Furthermore, the system 11 may comprise one or more scan devices 80, i.e., scanners, configured for acquiring scan data of physical copies of elements 102, 104 of dental prosthetic assemblies 100 manufactured using the system 11. The scan data, e.g., scan data of physical copy of an element 102, 104 may be used for providing a 3D digital scan model of at least a part of the respective physical copy of element 102, 104. The template used for the manufacturing the respective physical copy of element 102, 104. May be replaced at least partially by the scan model for determining deviations of the mechanical connection using the scan model violating one or more fitting criteria. This scan device 80 may, e.g., comprise an optical scanner configured for performing an optical scan of a surface of a manufactured element 102, 104 of a dental prosthetic assembly 100. The scan device 80 may, e.g., comprise another type of scanner suitable for acquiring scan data of manufactured elements 102, 104 of dental prosthetic assemblies 100. The scan device 80 may, e.g., comprise an X-ray scanner.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium. A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. In some embodiments, a computer-readable storage medium may also be able to store data which is able to be accessed by the processor of the computing device.

Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computer device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. In some embodiments, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computer system or distributed amongst multiple computer systems. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computer system. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products according to embodiments of the invention. It will be understood that each block or a portion of the blocks of the flowchart, illustrations, and/or block diagrams, can be implemented by computer program instructions in form of computer executable code when applicable. It is further under stood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Possible advantageous embodiments may comprise the following combinations of features:

1. A method for manufacturing a dental prosthetic assembly, the dental prosthetic assembly comprising a first and a second element,
   the first element comprising a first connection portion with a reception configured to establish a mechanical connection between the first and the second element by receiving a protrusion of a second connection portion comprised by the second element,
   the method comprising:
   providing a first 3D digital model of the first element as a first template and a second 3D digital model of the second element as a second template,
   manufacturing a first physical copy of the first element using the first template or of the second element using the second template,
   acquiring scan data of the manufactured first physical copy,
   providing a 3D digital scan model of at least a part of the manufactured first physical copy using the scan data,
   determining using the scan model deviations of the mechanical connection violating one or more fitting criteria, when replacing for establishing the mechanical connection the template used for the manufacturing of the first physical copy by the scan model,
   compensating the determined deviations of the mechanical connection to satisfy the one or more violated fitting criteria, wherein the compensating comprises modifying the template not used for manufacturing the first physical copy,
   manufacturing a second physical copy using the modified template.

2. The method of feature combination 1, wherein the method further comprises simulating a manufacturing of a second physical copy of the second element using the template not used for manufacturing the first physical copy resulting in simulation results, wherein for the determining the deviations of the mechanical connection violating the one or more fitting criteria, the template not used for manufacturing the first physical copy is replaced by the simulation results for establishing the mechanical connection.

3. The method of any of feature combinations 1 or 2, wherein the compensating of the determined deviations further comprises:
   additionally modifying the template used for manufacturing the first physical copy to compensate the determined deviations,
   re-manufacturing the first physical copy using the additionally modified template.

4. The method of any of feature combinations 1 or 2, wherein the compensating of the determined deviations further comprises:
   additionally modifying the template used for manufacturing the first physical copy by removing one or more parts of the respective template to compensate the determined deviations,
   determining machining parameters for a subsequent machining of the manufactured first physical copy using the additionally modified template,
   subsequent machining of the manufactured first physical copy using the determined machining parameters to compensate the determined deviations.

5. The method of feature combination 4, wherein for the subsequent machining of the first physical copy the same machining tool is used as for the manufacturing of the first physical copy or a different machining tool is used with a reduced size compared to the machining tool used for the manufacturing of the first physical copy.

6. The method of any of the preceding feature combinations, wherein the manufacturing of the second physical copy is started using the template not used for manufacturing the first physical copy, wherein the manufacturing of the second physical copy is started simultaneously with or during one of the following process steps: the manufacturing of the first physical copy, the acquiring of the scan data of the manufactured first physical copy, the providing of the scan model, the determining of the deviations of the mechanical connection, the compensating of the determined deviations, wherein the manufacturing of the second physical copy using the template not used for manufacturing the first physical copy is interrupted at an intermediate state, wherein, upon finishing the modifying of the template not used for manufacturing the first physical copy, the interrupted manufacturing of the second physical copy is continued using the modified template to finalize the manufacturing.

7. The method of any of feature combinations 1 to 5, wherein the manufacturing of the second physical copy is started after the modifying of the template not used for manufacturing the first physical copy is finished.

8. The method of any of the preceding feature combinations, wherein the mechanical connection, when being established, defines a relative position of the second element with respect to the first element, wherein the fitting criteria comprise a first maximum value for deviations of the second element from the defined relative position.

9. The method of any of the preceding feature combinations, wherein the mechanical connection, when being established, defines a relative orientation of the second element with respect to the first element, wherein the fitting criteria comprise a second maximum value for deviations of the second element from the defined relative orientation.

10. The method of any of the preceding feature combinations, wherein the determining of the deviations of the mechanical connection is restricted to selected sections of the mechanical connection comprising one or more of the following: a set of one or more selected first sections of the first connection portion, a set of one or more selected second sections of the second connection portion.

11. The method of feature combination 10, wherein the selected one or more first sections cover the entire first connection portion.

12. The method of feature combination 10, wherein the selected one or more first sections cover one or more sub-portions of the first connection portion with one or more sub-portions of the first connection portion remaining uncovered.

13. The method of any of the feature combinations 10 to 12, wherein the selected one or more second sections cover the entire second connection portion.

14. The method of any of the feature combinations 10 to 13, wherein the selected one or more second sections cover one or more sub-portions of the second connection portion with one or more sub-portions of the second connection portion remaining uncovered.

15. The method of any of the feature combinations 10 to 14, wherein the selected first and second sections are selected pairwise, the first and second section of each pair comprising a first and second surface facing each other.

16. The method of any of the feature combinations 10 to 15, wherein image pattern recognition is used for selecting the first and second sections, the image pattern recognition being one of the following: a 2D image pattern recognition, a 3D image pattern recognition.

17. The method of any of the preceding feature combinations, wherein the mechanical connection, when being established, defines a clearance between the first and second connection portion, the fitting criteria comprising a minimum value of the clearance.

18. The method of feature combination 17, deviations of the mechanical connection with respect to the clearance being determined between the selected first and second sections of the templates.

19. The method of any of the feature combinations 17 to 18, wherein the fitting criteria further comprise a maximum value of the clearance.

20. The method of any of the preceding feature combinations, further comprising determining using the acquired scan data deviations of the manufactured first physical copy from the template used for the manufacturing of the first physical copy violating the fitting criteria, the fitting criteria further comprising a maximum value of the deviations of the manufactured first physical copy.

21. The method of feature combination 20, wherein the deviations of the manufactured first physical copy are determined within the selected sections of the respective template violating one or more fitting criteria.

22. The method of feature combination 21, wherein for the determining of the deviations scan data of the selected ones of the sections of the manufactured first physical copy is selected from the acquired scan data.

23. The method of feature combination 22, wherein image pattern recognition is used for the selecting of the scan data, the image pattern recognition being one of the following: a 2D image pattern recognition, a 3D image pattern recognition.

24. The method of any of the preceding feature combinations, wherein one or more of the fitting criteria are position depending.

25. The method of any of the preceding feature combinations, wherein the first and second connection portions comprise one or more of the following of the first and second connection portion: a ridge, a notch, a rim, an edge, a hole.

26. The method of any of the preceding feature combinations, wherein the determining of the deviations comprises a registration of the scan model with the template used for the manufacturing of the first physical copy.

27. The method of feature combination 26, wherein image pattern recognition is used for the registration of the scan model with the template used for the manufacturing of the first physical copy, the image pattern recognition being one of the following: a 2D image pattern recognition, a 3D image pattern recognition.

28. The method of feature combination 27, wherein the scan model is registered with the template used for the manufacturing of the first physical copy directly.

29. The method of feature combination 27, wherein the scan model is registered with the template used for the manufacturing of the first physical copy indirectly comprising:

defining a position of the template used for the manufacturing of the first physical copy within a fourth 3D digital model of at least a part of a dentition of a patient, arranging the scan model in the fourth 3D digital model at the predefined position within the fourth 3D digital model.

30. The method of any of feature combinations 27 to 29, wherein the template used for the manufacturing of the first physical copy comprises one or more markers, wherein the first physical copy comprises copies of the one or more markers, the one or more markers being used for the registration of the scan model with the template used for the manufacturing of the first physical copy.

31. The method of any of the preceding feature combinations, wherein the first and second physical copy are manufactured using at least one of the following: machining, 3D printing.

32. The method of any of the preceding feature combinations, wherein the second element is an abutment and the first element is one of the following: a crown, an abutment tooth of a bridge, an abutment tooth of a partial removable denture.

33. The method of any of the preceding feature combinations, wherein the second element is a bar and the first element is one of the following: a bar denture, a part of a bar denture.

34. A computer program product for manufacturing a dental prosthetic assembly, the dental prosthetic assembly comprising a first and a second element,
the first element comprising a first connection portion with a reception configured to establish a mechanical connection between the first and the second element by receiving a protrusion of a second connection portion comprised by the second element,
the computer program product comprising a computer readable storage medium having program instructions embodied therewith, the program instructions being executable by a processor of a computer device of a manufacturing system to cause the computer device to control the manufacturing system to:
provide a first 3D digital model of the first element as a first template and a second 3D digital model of the second element as a second template,
manufacture a first physical copy of the first element using the first template or the second element using the second template,
acquire scan data of the manufactured first physical copy,
provide a 3D digital scan model of at least a part of the manufactured first physical copy using the scan data,
determine using the scan model deviations of the mechanical connection violating one or more fitting criteria, when replacing for establishing the mechanical connection the template used for the manufacturing of the first physical copy by the scan model,
compensate the determined deviations of the mechanical connection to satisfy the one or more violated fitting criteria, wherein the compensating comprises modifying the template not used for manufacturing the first physical copy,
manufacture a second physical copy using the modified template.

35. A manufacturing system for manufacturing a dental prosthetic assembly, the dental prosthetic assembly comprising a first and a second element,
the first element comprising a first connection portion with a reception configured to establish a mechanical connection between the first and the second element by receiving a protrusion of a second connection portion comprised by the second element,
the manufacturing system comprising a computer device and one or more manufacturing devices, the computer device comprising a processor and a memory storing program instructions executable by the processor, execution of the program instructions by the processor causing the computer device to control the manufacturing system using the manufacturing device to:
provide a first 3D digital model of the first element as a first template and a second 3D digital model of the second element as a second template,
manufacture a first physical copy of the first element using the first template or the second element using the second template,
acquire scan data of the manufactured first physical copy,
provide a 3D digital scan model of at least a part of the manufactured first physical copy using the scan data,
determine using the scan model deviations of the mechanical connection violating one or more fitting criteria, when replacing for establishing the mechanical connection the template used for the manufacturing of the first physical copy by the scan model,
compensate the determined deviations of the mechanical connection to satisfy the one or more violated fitting criteria, wherein the compensating comprises modifying the template not used for manufacturing the first physical copy,
manufacture a second physical copy using the modified template.

36. The manufacturing system of feature combination 35, wherein the manufacturing devices comprise one or more of the following: a machining device, a 3D printing device.

LIST OF REFERENCE NUMERALS 10 computer system
11 system
14 external device
16 processing unit
18 bus
20 network adapter
22 I/O interface
24 display
28 memory
30 RAM
32 cache
34 storage system
40 program
42 program module
50 user interface
52 control elements
54 hardware device
56 keyboard
58 mouse
60 3D printing device
62 printing element
70 machining device
72 machining tool
74 holding device
76 blank
78 raw material
80 scan device
100 dental prosthetic assembly
102 crown
104 abutment
105 rim
106 screw
108 implant
110 neglected surface
112 reception
114 protrusion
116 deviation

The invention claimed is:

1. A method for manufacturing a dental prosthetic assembly, the dental prosthetic assembly comprising a first and a second element,
the first element comprising a first connection portion with a reception configured to establish a mechanical connection between the first and the second element by receiving a protrusion of a second connection portion comprised by the second element,
the method comprising:
providing a first 3D digital model of the first element as a first template and a second 3D digital model of the second element as a second template,
manufacturing a first physical copy of the first element using the first template or of the second element using the second template,
acquiring scan data of the manufactured first physical copy,
providing a 3D digital scan model of at least a part of the manufactured first physical copy using the scan data,
determining, using the 3D digital scan model, deviations of the mechanical connection violating one or more fitting criteria, when replacing, for establishing the mechanical connection, the first template or the second template, used for the manufacturing of the first physical copy, by the 3D digital scan model,
compensating the determined deviations of the mechanical connection to satisfy the one or more fitting criteria that are violated, wherein the compensating comprises modifying the first template or the second template not used for manufacturing the first physical copy,
manufacturing a second physical copy using the modified template.

2. The method of claim 1, wherein the method further comprises simulating a manufacturing of a second physical copy of the second element using the template not used for manufacturing the first physical copy resulting in simulation results, wherein for the determining the deviations of the mechanical connection violating the one or more fitting criteria, the template not used for manufacturing the first physical copy is replaced by the simulation results for establishing the mechanical connection.

3. The method of claim 1, wherein the compensating of the determined deviations further comprises:
additionally modifying the template used for manufacturing the first physical copy to compensate the determined deviations,
re-manufacturing the first physical copy using the additionally modified template.

4. The method of claim 1, wherein the compensating of the determined deviations further comprises:
additionally modifying the template used for manufacturing the first physical copy by removing one or more parts of the respective template to compensate the determined deviations,
determining machining parameters for a subsequent machining of the manufactured first physical copy using the additionally modified template,
subsequent machining of the manufactured first physical copy using the determined machining parameters to compensate the determined deviations.

5. The method of claim 4, wherein for the subsequent machining of the first physical copy the same machining tool is used as for the manufacturing of the first physical copy or a different machining tool is used with a reduced size compared to the machining tool used for the manufacturing of the first physical copy.

6. The method of claim 1, wherein the manufacturing of the second physical copy is started using the template not used for manufacturing the first physical copy, wherein the manufacturing of the second physical copy is started simultaneously with or during one of the following process steps: the manufacturing of the first physical copy, the acquiring of the scan data of the manufactured first physical copy, the providing of the 3D digital scan model, the determining of the deviations of the mechanical connection, the compensating of the determined deviations,
wherein the manufacturing of the second physical copy using the template not used for manufacturing the first physical copy is interrupted at an intermediate state,
wherein, upon finishing the modifying of the template not used for manufacturing the first physical copy, the interrupted manufacturing of the second physical copy is continued using the modified template to finalize the manufacturing.

7. The method of claim 1, wherein the manufacturing of the second physical copy is started after the modifying of the template not used for manufacturing the first physical copy is finished.

8. The method of claim 1, wherein the mechanical connection, when being established, defines a relative position of the second element with respect to the first element, wherein the fitting criteria comprise a first maximum value for deviations of the second element from the defined relative position.

9. The method of claim 1, wherein the mechanical connection, when being established, defines a relative orientation of the second element with respect to the first element, wherein the fitting criteria comprise a second maximum value for deviations of the second element from the defined relative orientation.

10. The method of claim 1, wherein the determining of the deviations of the mechanical connection is restricted to selected sections of the mechanical connection comprising one or more of the following: a set of one or more selected first sections of the first connection portion, a set of one or more selected second sections of the second connection portion.

11. The method of claim 10, wherein the selected one or more first sections cover the entire first connection portion.

12. The method of claim 10, wherein the selected one or more first sections cover one or more sub-portions of the first connection portion with one or more sub-portions of the first connection portion remaining uncovered.

13. The method of claim 10, wherein the selected one or more second sections cover the entire second connection portion.

14. The method of claim 10, wherein the selected one or more second sections cover one or more sub-portions of the second connection portion with one or more sub-portions of the second connection portion remaining uncovered.

15. The method of claim 10, wherein the selected first and second sections are selected pairwise, the first and second section of each pair comprising a first and second surface facing each other.

16. The method of claim 10, wherein image pattern recognition is used for selecting the first and second sections, the image pattern recognition being one of the following: a 2D image pattern recognition, a 3D image pattern recognition.

17. The method of claim 1, wherein the mechanical connection, when being established, defines a clearance between the first and second connection portion, the fitting criteria comprising a minimum value of the clearance.

18. The method of claim 17, deviations of the mechanical connection with respect to the clearance being determined between the selected first and second sections of the templates.

19. The method of claim 17, wherein the fitting criteria further comprise a maximum value of the clearance.

20. The method of claim 1, further comprising determining using the acquired scan data deviations of the manufactured first physical copy from the template used for the manufacturing of the first physical copy violating the fitting criteria, the fitting criteria further comprising a maximum value of the deviations of the manufactured first physical copy.

21. The method of claim 20, wherein the deviations of the manufactured first physical copy are determined within the selected sections of the respective template violating one or more fitting criteria.

22. The method of claim 21, wherein for the determining of the deviations scan data of the selected ones of the sections of the manufactured first physical copy is selected from the acquired scan data.

23. The method of claim 22, wherein image pattern recognition is used for the selecting of the scan data, the image pattern recognition being one of the following: a 2D image pattern recognition, a 3D image pattern recognition.

24. The method of claim 1, wherein one or more of the fitting criteria are position depending.

25. The method of claim 1, wherein the first and second connection portions comprise one or more of the following of the first and second connection portion: a ridge, a notch, a rim, an edge, a hole.

26. The method of claim 1, wherein the determining of the deviations comprises a registration of the 3D digital scan model with the template used for the manufacturing of the first physical copy.

27. The method of claim 26, wherein image pattern recognition is used for the registration of the 3D digital scan model with the template used for the manufacturing of the first physical copy, the image pattern recognition being one of the following: a 2D image pattern recognition, a 3D image pattern recognition.

28. The method of claim 27, wherein the 3D digital scan model is registered with the template used for the manufacturing of the first physical copy directly.

29. The method of claim 27, wherein the 3D digital scan model is registered with the template used for the manufacturing of the first physical copy indirectly comprising:
defining a position of the template used for the manufacturing of the first physical copy within a fourth 3D digital model of at least a part of a dentition of a patient,
arranging the 3D digital scan model in the fourth 3D digital model at the predefined position within the fourth 3D digital model.

30. The method of claim 27, wherein the template used for the manufacturing of the first physical copy comprises one or more markers, wherein the first physical copy comprises copies of the one or more markers, the one or more markers being used for the registration of the 3D digital scan model with the template used for the manufacturing of the first physical copy.

31. The method of claim 1, wherein the first and second physical copy are manufactured using at least one of the following: machining, 3D printing.

32. The method of claim 1, wherein the second element is an abutment and the first element is one of the following: a crown, an abutment tooth of a bridge, an abutment tooth of a partial removable denture.

33. The method of claim 1, wherein the second element is a bar and the first element is one of the following: a bar denture, a part of a bar denture.

34. A computer program product for manufacturing a dental prosthetic assembly, the dental prosthetic assembly comprising a first and a second element,
the first element comprising a first connection portion with a reception configured to establish a mechanical connection between the first and the second element by receiving a protrusion of a second connection portion comprised by the second element,
the computer program product comprising a computer readable storage medium having program instructions embodied therewith, the program instructions being executable by a processor of a computer device of a manufacturing system to cause the computer device to control the manufacturing system to:
provide a first 3D digital model of the first element as a first template and a second 3D digital model of the second element as a second template,
manufacture a first physical copy of the first element using the first template or the second element using the second template,
acquire scan data of the manufactured first physical copy,
provide a 3D digital scan model of at least a part of the manufactured first physical copy using the scan data,
determine, using the 3D digital scan model, deviations of the mechanical connection violating one or more fitting criteria, when replacing, for establishing the mechanical connection, the first template or the second template, used for the manufacturing of the first physical copy, by the 3D digital scan model,
compensate the determined deviations of the mechanical connection to to satisfy the one or more fitting criteria that are violated, wherein the compensating comprises modifying the first template or the second template not used for manufacturing the first physical copy,
manufacture a second physical copy using the modified template.

35. A manufacturing system for manufacturing a dental prosthetic assembly, the dental prosthetic assembly comprising a first and a second element,
the first element comprising a first connection portion with a reception configured to establish a mechanical connection between the first and the second element by receiving a protrusion of a second connection portion comprised by the second element,
the manufacturing system comprising a computer device and one or more manufacturing devices, the computer device comprising a processor and a memory storing program instructions executable by the processor, execution of the program instructions by the processor causing the computer device to control the manufacturing system using the manufacturing device to:
provide a first 3D digital model of the first element as a first template and a second 3D digital model of the second element as a second template,
manufacture a first physical copy of the first element using the first template or the second element using the second template, acquire scan data of the manufactured first physical copy, provide a 3D digital scan model of at least a part of the manufactured first physical copy using the scan data, determine, using the 3D digital scan model, deviations of the mechanical connection violating one or more fitting criteria, when replacing, for establishing the mechanical connection, the first template or the second template, used for the manufacturing of the first physical copy, by the 3D digital scan model, compensate the determined deviations of the mechanical connection to to satisfy the one or more fitting criteria that are violated, wherein the compensating comprises modifying the first template or the second template not used for manufacturing the first physical copy, manufacture a second physical copy using the modified template.

36. The manufacturing system of claim 35, wherein the manufacturing devices comprise one or more of the following: a machining device, a 3D printing device.

* * * * *